(12) United States Patent
Tamaru et al.

(10) Patent No.: US 12,541,115 B2
(45) Date of Patent: Feb. 3, 2026

(54) OPTICAL ISOLATOR, ULTRAVIOLET LASER APPARATUS, AND ELECTRONIC DEVICE MANUFACTURING METHOD

(71) Applicants: Gigaphoton Inc., Tochigi (JP); Inter-University Research Institute Corporation, National Institutes of Natural Sciences, Tokyo (JP)

(72) Inventors: Yuki Tamaru, Oyama (JP); Taisuke Miura, Oyama (JP); Ryo Yasuhara, Toki (JP)

(73) Assignees: Gigaphoton Inc., Tochigi (JP); Inter-University Research Institute Corporation, National Institutes of Natural Sciences, Tokyo (JP)

( * ) Notice: Subject to any disclaimer, the term of this patent is extended or adjusted under 35 U.S.C. 154(b) by 413 days.

(21) Appl. No.: 18/363,279

(22) Filed: Aug. 1, 2023

(65) Prior Publication Data

US 2023/0375846 A1 Nov. 23, 2023

Related U.S. Application Data

(63) Continuation of application No. PCT/JP2021/011550, filed on Mar. 19, 2021.

(51) Int. Cl.
*G02B 27/28* (2006.01)
*H01S 3/04* (2006.01)
(Continued)

(52) U.S. Cl.
CPC ............ *G02B 27/28* (2013.01); *H01S 3/0401* (2013.01); *H01S 3/2251* (2013.01); *H01S 3/2256* (2013.01); *H01S 3/23* (2013.01)

(58) Field of Classification Search
CPC ..... G02B 27/28; H01S 3/0401; H01S 3/2251; H01S 3/2256; H01S 3/23; H01S 3/08009;
(Continued)

(56) References Cited

U.S. PATENT DOCUMENTS

2014/0218795 A1* 8/2014 Scerbak ................. G02F 1/093
359/484.04
2014/0346374 A1* 11/2014 Yanagida ............... G02F 1/093
359/333
2015/0285744 A1* 10/2015 Ogawa ............... G01N 21/8806
348/126

FOREIGN PATENT DOCUMENTS

JP S61-141189 A 6/1986
JP 2004-302412 A 10/2004
(Continued)

OTHER PUBLICATIONS

International Search Report issued in PCT/JP2021/011550; mailed Jun. 8, 2021.
International Preliminary Report On Patentability and Written Opinion issued in PCT/JP2021/011550; issued Sep. 12, 2023.
Vyatkin, Anton & Snetkov, Ilya & Palashov, Oleg & Khazanov, Efim, "Specificity of Thermally Induced Depolarization in CaF2", 2013 Conference on Lasers and Electro-Optics, CLEO 2013. 10.1364/CLEO_SI.2013.CTu1O.5.

*Primary Examiner* — Shan Liu
(74) *Attorney, Agent, or Firm* — Studebaker Brackett PLLC

(57) ABSTRACT

An optical isolator according to an aspect of the present disclosure includes a first polarizer through which incident light transmits, a Faraday rotator configured to rotate the polarization direction of the light, and a second polarizer through which the light transmits. The Faraday rotator includes a calcium fluoride crystal. When a, b, and c axes are the [001], [100], and [010] crystallographic axes, respectively, and x, y, and z axes are obtained by rotating the three axes by a first angle of 40° to 50° about the c axis and by a second angle of 45° to 75° about the b axis rotated by the first angle, the z axis is parallel to the propagation direction of the light, and the calcium fluoride crystal is disposed such that the transmission axis of the first polarizer and the x axis have an angle difference of 0° to 45°.

20 Claims, 17 Drawing Sheets

(51) Int. Cl.
*H01S 3/225* (2006.01)
*H01S 3/23* (2006.01)

(58) Field of Classification Search
CPC .... H01S 3/10092; H01S 3/225; H01S 3/2366; H01S 3/0064; G02F 1/093
See application file for complete search history.

(56) References Cited

FOREIGN PATENT DOCUMENTS

| | | | | |
|---|---|---|---|---|
| JP | 2006-073921 | A | 3/2006 | |
| JP | 2011-225400 | A | 11/2011 | |
| JP | 2015-200645 | A | 11/2015 | |
| WO | WO-2004049039 | A1 * | 6/2004 | ............... G02F 1/09 |

* cited by examiner

Fig. 2
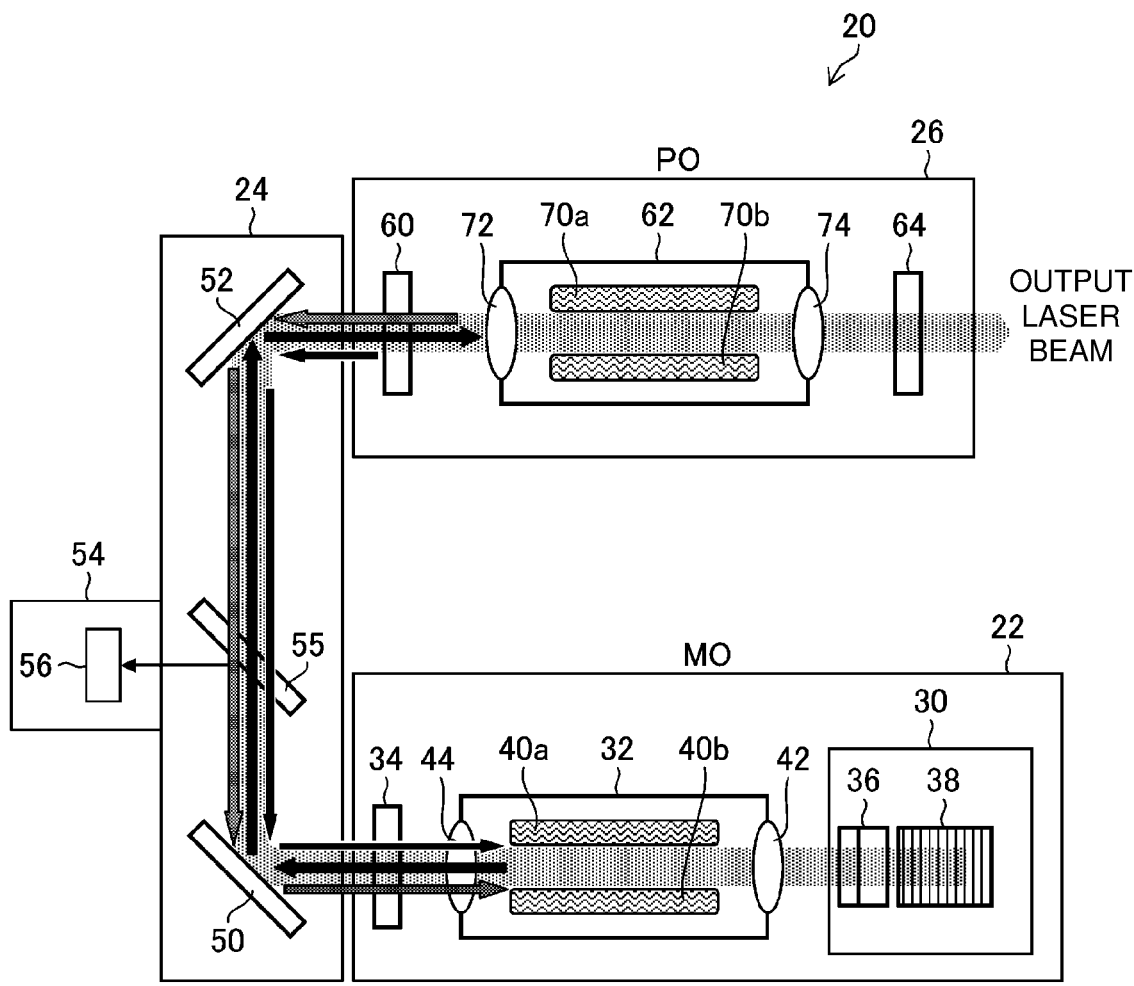
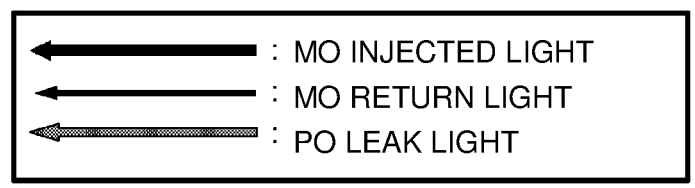

Fig. 1 $F$ for $CaF_2$ (dash dot) and calculated minimal integral depolarization degrees in a $CaF_2$ disk (solid) and rod (dash) at $p = 10$ as functions of the Euler angle $\beta$ (see inset).

| WAVELENGTH | 193 nm | | 248 nm | |
|---|---|---|---|---|
| VERDET CONSTANT | 40.1 rad/Tm | | 19.0 rad/Tm | |
| ITEM | MAGNETIC FIELD (T) | THICKNESS (mm) | MAGNETIC FIELD (T) | THICKNESS (mm) |
| SELECTABLE RANGE | 0.5 – 3.0 | 6 – 40 | 0.5 – 3.0 | 13 – 83 |
| PREFERABLE RANGE | 0.75 – 2.9 | 10 – 30 | 0.75 – 2.9 | 20 – 55 |
| MOST PREFERABLE RANGE | 0.8 – 1.5 | 15 – 25 | 0.8 – 1.5 | 30 – 50 |

OPTICAL ISOLATOR, ULTRAVIOLET LASER APPARATUS, AND ELECTRONIC DEVICE MANUFACTURING METHOD

CROSS-REFERENCE TO RELATED APPLICATIONS

The present application is a continuation application of International Application No. PCT/JP2021/011550, filed on Mar. 19, 2021, the entire contents of which are hereby incorporated by reference.

BACKGROUND

1. Technical Field

The present disclosure relates to an optical isolator, an ultraviolet laser apparatus, and an electronic device manufacturing method.

2. Related Art

Recently, in a semiconductor exposure apparatus, resolving power improvement has been requested along with miniaturization and high integration of a semiconductor integrated circuit. Thus, the wavelength of light discharged from an exposure light source has been shortened. Examples of a gas laser apparatus for exposure include a KrF excimer laser apparatus configured to output a laser beam having a wavelength of approximately 248 nm and an ArF excimer laser apparatus configured to output a laser beam having a wavelength of approximately 193 nm.

The KrF excimer laser apparatus and the ArF excimer laser apparatus have a wide spectrum line width of 350 pm to 400 pm for spontaneous oscillation light. Thus, chromatic aberration occurs in some cases when a projection lens is made of a material that transmits ultraviolet light such as KrF and ArF laser beams. This can lead to resolving power decrease. Thus, the spectrum line width of a laser beam output from the gas laser apparatus needs to be narrowed so that chromatic aberration becomes negligible. To narrow the spectrum line width, a line narrowing module (LNM) including a line narrowing element (for example, etalon or grating) is provided in a laser resonator of the gas laser apparatus in some cases. In the following, a gas laser apparatus that achieves narrowing of the spectrum line width is referred to as a line narrowed gas laser apparatus.

LIST OF DOCUMENTS

Patent Documents

Patent Document 1: Japanese Unexamined Patent Application Publication No. 2006-73921
Patent Document 2: Japanese Unexamined Patent Application Publication No. 61-141189
Patent Document 3: Japanese Unexamined Patent Application Publication No. 2011-225400

Non-Patent Document

Non-Patent Document 1: Vyatkin, Anton & Snetkov, Ilya & Palashov, Oleg & Khazanov, Efim. "Specificity of Thermally Induced Depolarization in CaF2." 2013 Conference on Lasers and Electro-Optics, CLEO 2013. 10.1364/CLEO_SI.2013.CTu1O.5.

SUMMARY

An optical isolator according to an aspect of the present disclosure includes a first polarizer disposed to have a transmission axis with a normalized transmittance of 0.9 or higher for incident light, the incident light being linearly polarized light having an ultraviolet wavelength, a Faraday rotator containing a Faraday material that rotates a polarization direction of light having transmitted through the first polarizer by a magnetic field, and a second polarizer disposed to have a transmission axis with a normalized transmittance of 0.9 or higher for the incident light having transmitted through the Faraday rotator. The Faraday material is calcium fluoride crystal. When a, b, and c axes are defined to be [001], [100], and [010] crystallographic axes of the calcium fluoride crystal, respectively, and x, y, and z axes are defined to be respective axes obtained by rotating the three axes of the a, b, and c axes by a first angle about the c axis and by a second angle about the b axis rotated by the first angle, the first angle is 40° to 50° inclusive, the second angle is 45° to 75° inclusive, the z axis is parallel to a propagation direction of light incident on the calcium fluoride crystal from the first polarizer, and the calcium fluoride crystal is disposed such that the transmission axis of the first polarizer and the x axis have an angle difference of 0° to 45° inclusive.

An ultraviolet laser apparatus according to another aspect of the present disclosure includes an oscillation-stage laser configured to output a pulse laser beam of linearly polarized light having an ultraviolet wavelength, an amplifier configured to amplify and output the pulse laser beam, and an optical isolator disposed on an optical path between the oscillation-stage laser and the amplifier. The optical isolator includes a first polarizer disposed to have a transmission axis with a normalized transmittance of 0.9 or higher for incident light, the incident light being linearly polarized light having an ultraviolet wavelength, a Faraday rotator containing a Faraday material that rotates a polarization direction of light having transmitted through the first polarizer by a magnetic field, and a second polarizer disposed to have a transmission axis with a normalized transmittance of 0.9 or higher for the incident light having transmitted through the Faraday rotator. The Faraday material is calcium fluoride crystal. When a, b, and c axes are defined to be [001], [100], and [010] crystallographic axes of the calcium fluoride crystal, respectively, and x, y, and z axes are defined to be respective axes obtained by rotating the three axes of the a, b, and c axes by a first angle about the c axis and by a second angle about the b axis rotated by the first angle, the first angle is 40° to 50° inclusive, the second angle is 45° to 75° inclusive, the z axis is parallel to a propagation direction of light incident on the calcium fluoride crystal from the first polarizer, and the calcium fluoride crystal is disposed such that the transmission axis of the first polarizer and the x axis have an angle difference of 0° to 45° inclusive.

An electronic device manufacturing method according to another aspect of the present disclosure includes generating a laser beam amplified by an amplifier by using an ultraviolet laser apparatus, outputting the amplified laser beam to an exposure apparatus, and exposing a photosensitive substrate to the laser beam in the exposure apparatus to manufacture an electronic device. The ultraviolet laser apparatus includes an oscillation-stage laser configured to output a pulse laser beam of linearly polarized light having an ultraviolet wavelength, the amplifier configured to amplify and output the pulse laser beam, and an optical isolator disposed on an optical path between the oscillation-stage laser and the amplifier. The optical isolator includes a first polarizer disposed to have a transmission axis with a normalized transmittance of 0.9 or higher for incident light, the incident light being linearly polarized light having an ultraviolet wavelength, a Faraday rotator containing a Faraday material that rotates a polarization direction of light having transmitted through the first polarizer by a magnetic field, and a second polarizer disposed to have a transmission axis with a normalized transmittance of 0.9 or higher for the incident light having transmitted through the Faraday rotator. The Faraday material is calcium fluoride crystal. When a, b, and c axes are defined to be [001], [100], and [010] crystallographic axes of the calcium fluoride crystal, respectively, and x, y, and z axes are defined to be respective axes obtained by rotating the three axes of the a, b, and c axes by a first angle about the c axis and by a second angle about the b axis rotated by the first angle, the first angle is 40° to 50° inclusive, the second angle is 45° to 75° inclusive, the z axis is parallel to a propagation direction of light incident on the calcium fluoride crystal from the first polarizer, and the calcium fluoride crystal is disposed such that the transmission axis of the first polarizer and the x axis have an angle difference of 0° to 45° inclusive.

BRIEF DESCRIPTION OF THE DRAWINGS

Embodiments of the present disclosure will be described below merely as examples with reference to the accompanying drawings.

FIG. 2 is a diagram illustrating a problem of the ultraviolet laser apparatus according to the comparative example.

DESCRIPTION OF EMBODIMENTS

<Contents>
1. Terms
2. Overview of ultraviolet laser apparatus according to comparative example
   2.1 Configuration
   2.2 Operation
3. Problem
4. Embodiment 1
   4.1 Configuration
   4.2 Relation between transmission axis of first polarizer and crystallographic axes of Faraday material
   4.3 Rotation angles α and β
   4.4 Preferable ranges of magnetic field and thickness of Faraday material
   4.5 Allowable angle difference between transmission axis of polarizer and polarization direction of laser beam
   4.6 Operation
   4.7 Effect
   4.8 Crystallographic axis verification method
   4.9 Modification
5. Embodiment 2
   5.1 Configuration
   5.2 Operation
   5.3 Effect
6. Embodiment 3
   6.1 Configuration
   6.2 Operation
   6.3 Effect
7. Embodiment 4
   7.1 Configuration
   7.2 Operation
   7.3 Effect
   7.4 Modification
8. Embodiment 5
   8.1 Configuration
   8.2 Operation
   8.3 Effect 9. Embodiment 6
  9.1 Configuration
  9.2 Operation
  9.3 Effect
10. Embodiment 7
  10.1 Configuration
  10.2 Operation
  10.3 Effect
11. Electronic device manufacturing method
12. Other application example of optical isolator
13. Other Embodiments of the present disclosure will be described below in detail with reference to the accompanying drawings. The embodiments described below are examples of the present disclosure, and do not limit the contents of the present disclosure. Not all configurations and operations described in each embodiment are necessarily essential as configurations and operations of the present disclosure. Components identical to each other are denoted by an identical reference sign, and duplicate description thereof will be omitted.

1. Terms

A "polarizer" is an optical element configured to separate light having a particular polarization direction (transmission axial direction) from light having a polarization direction orthogonal to the particular polarization direction.

The term "parallel" in the present specification is not limited to a case of being precisely parallel unless clearly understood otherwise from context or clearly stated otherwise, but includes the concept of being substantially parallel, which includes the range of an angle difference allowed in practical use without losing a technological meaning. In addition, the term "orthogonal" or "perpendicular" in the present specification is not limited to a case of being precisely orthogonal or perpendicular unless clearly understood otherwise from context or clearly stated otherwise, but includes the concept of being substantially orthogonal or substantially perpendicular, which includes the range of an angle difference allowed in practical use without losing a technological meaning.

Figure 1:
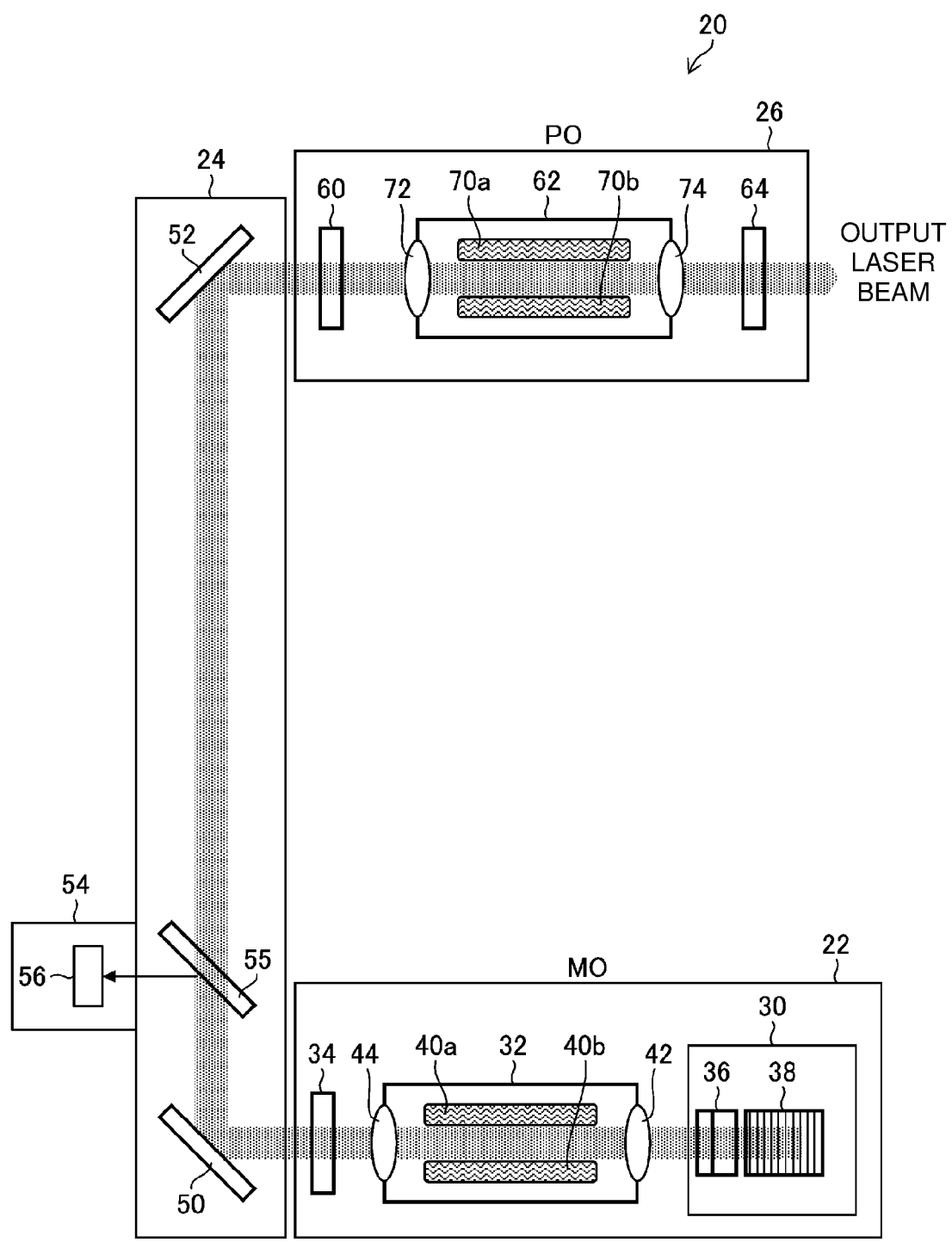
FIG. 1 is a side view schematically illustrating the configuration of an ultraviolet laser apparatus according to a comparative example.

2. Overview of Ultraviolet Laser Apparatus According to Comparative Example 2.1 Configuration FIG. 1 is a side view schematically illustrating the configuration of an ultraviolet laser apparatus 20 according to a comparative example. The comparative example of the present disclosure is an example that the applicant recognizes as known only by the applicant, but is not a publicly known example that is recognized by the applicant.

The ultraviolet laser apparatus 20 is an excimer laser apparatus including a master oscillator (MO) 22, an MO beam steering unit 24, and a power oscillator (PO) 26. The MO 22 includes a line narrowing module (LNM) 30, a chamber 32, and an output coupling mirror 34.

The LNM 30 includes a prism expander 36 for spectrum width narrowing, and a grating 38. The prism expander 36 and the grating 38 are disposed in Littrow arrangement with which an incident angle matches a diffracting angle. The output coupling mirror 34 is a partially reflective mirror having a reflectance of 40% to 60%. The output coupling mirror 34 is disposed to constitute an optical resonator together with the LNM 30.

The chamber 32 is disposed on the optical path of the optical resonator. The chamber 32 includes a pair of discharge electrodes 40a and 40b and two windows 42 and 44 through which laser beam transmits. The chamber 32 is filled with laser gas. The laser gas includes rare gas, halogen gas, and buffer gas. The rare gas may be, for example, argon (Ar) or krypton (Kr) gas. The halogen gas may be, for example, fluorine ($F_2$) gas. The buffer gas may be, for example, neon (Ne) gas. Voltage is applied between the discharge electrodes 40a and 40b by a non-illustrated power source. The power source may be a pulse power module (PPM) including a switch and a charging capacitor.

The MO beam steering unit 24 includes a high reflectance mirror 50 and a high reflectance mirror 52 and is disposed such that a laser beam output from the MO 22 is incident on the PO 26.

An MO pulse energy monitor 54 is disposed between the high reflectance mirrors 50 and 52. The MO pulse energy monitor 54 includes a beam splitter (BS) 55 and an optical sensor 56. The BS 55 is disposed on the optical path of a pulse laser beam output from the MO 22 and is disposed such that reflected light from the BS 55 is incident on the optical sensor 56.

The PO 26 is an amplification-stage laser including a rear mirror 60, a chamber 62, and an output coupling mirror 64. The rear mirror 60 and the output coupling mirror 64 constitute an optical resonator, and the chamber 62 is disposed on the optical path of the optical resonator.

The chamber 62 may have the same configuration as the chamber 32. The chamber 62 includes a pair of discharge electrodes 70a and 70b and two windows 72 and 74. The chamber 62 is filled with the laser gas. The rear mirror 60 may be, for example, a partially reflective mirror having a reflectance of 50% to 90%. The output coupling mirror 64 may be a partially reflective mirror having a reflectance of 10% to 30%.

2.2 Operation

High voltage pulse from the non-illustrated power source is applied between the discharge electrodes 40a and 40b in the chamber 32. When discharge occurs between the discharge electrodes 40a and 40b in the chamber 32, the laser gas is excited and a pulse laser beam having subjected to line narrowing by the optical resonator constituted by the output coupling mirror 34 and the LNM 30 and having an ultraviolet wavelength of 150 nm to 380 nm is output from the output coupling mirror 34.

Energy of the pulse laser beam output from the output coupling mirror 34 is measured by the MO pulse energy monitor 54. The pulse laser beam is incident as a seed beam on the rear mirror 60 of the PO 26 through the MO beam steering unit 24.

At a timing when the seed beam having transmitted through the rear mirror 60 is incident on the chamber 62, high voltage pulse from the non-illustrated power source is applied between the discharge electrodes 70a and 70b in the chamber 62. When discharge occurs between the discharge electrodes 70a and 70b in the chamber 62, the laser gas is excited, the seed beam is amplified by the Fabry-Perot optical resonator constituted by the output coupling mirror 64 and the rear mirror 60, and the amplified pulse laser beam is output as an output laser beam from the output coupling mirror 64.

3. Problem

FIG. 2 is a diagram illustrating a problem of the ultraviolet laser apparatus 20 according to the comparative example. Laser performance degrades in a case in which return light from the PO 26 returns to the MO 22. The "return light" means the sum of two kinds of light, namely, MO return light and PO leak light. Light output from the MO 22 is incident on the PO 26. Since the rear mirror 60 in the PO 26 is a partially reflective mirror (reflectance 50% to 90%), part of light incident on the rear mirror 60 does not proceed into the PO 26 but directly returns to the MO 22 side. Light reflected by the rear mirror 60 and returning to the MO 22 side without proceeding into the chamber 62 of the PO 26 is referred to as "MO return light".

Light incident on the PO 26 from the MO 22 and having transmitted through the rear mirror 60 is subjected to resonance and amplification in the PO 26 and is then output. Since the rear mirror 60 in the PO 26 is a partially reflective mirror as described above, part of light incident on the chamber 62 of the PO 26 and amplified returns to the MO 22. Light amplified through the PO 26 and returning to the MO 22 through the rear mirror 60 is referred to as "PO leak light".

Return light is a thermal load on the LNM 30 and the like and can cause degradation of line width stability, pulse energy stability, and the like. In a method, an optical isolator is disposed between the MO 22 and the PO 26 to suppress return light entering the MO 22.

Figure 3:
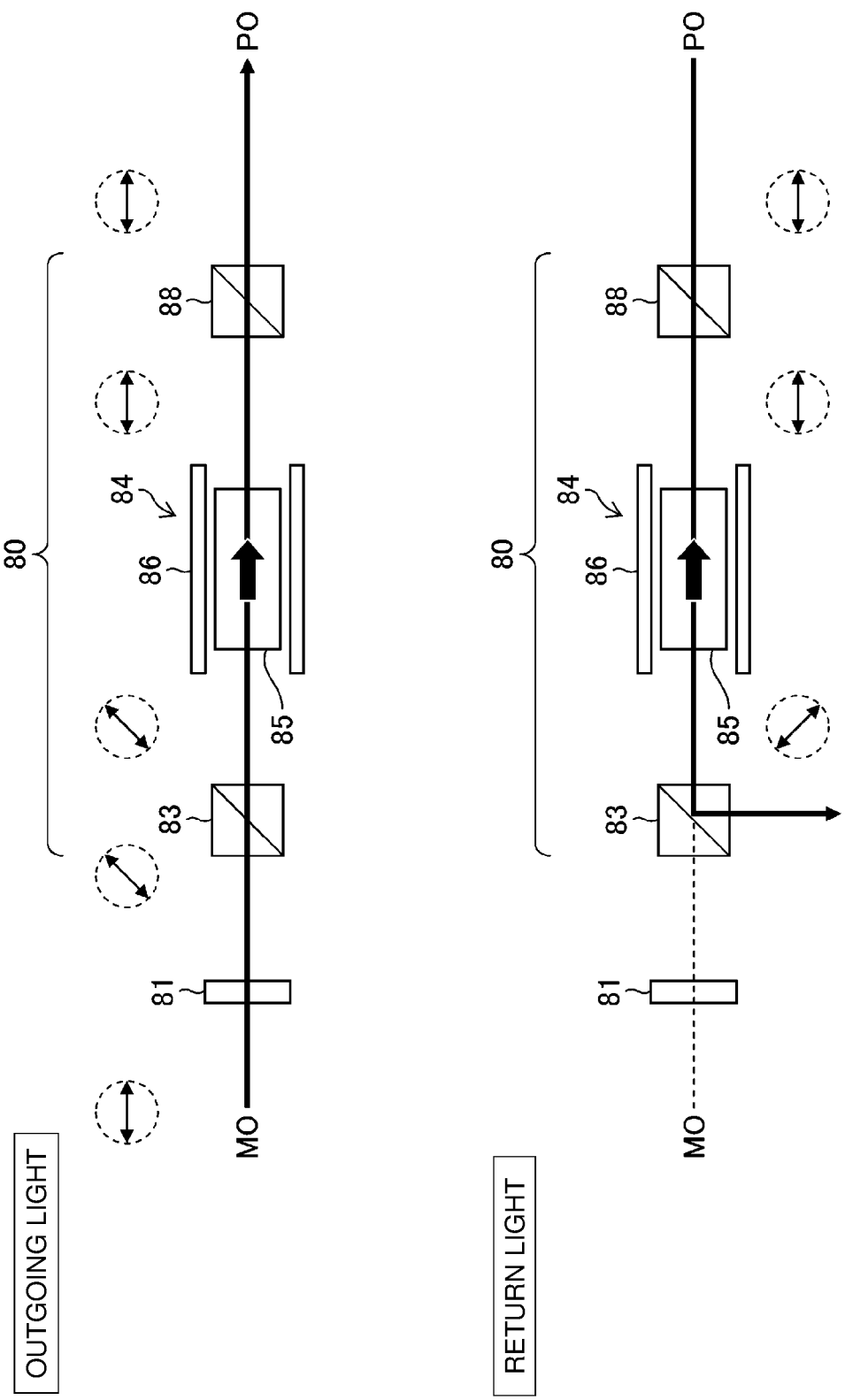
FIG. 3 schematically illustrates the configuration of an optical isolator configured to suppress return light according to the comparative example.

FIG. 3 illustrates an example of the configuration of an optical isolator 80 configured to suppress return light according to the comparative example. The upper part of FIG. 3 illustrates operation of the optical isolator 80 on a pulse laser beam (MO injected light: outgoing light) proceeding from the MO 22 toward the PO 26. The lower part of FIG. 3 illustrates operation of the optical isolator 80 on a laser beam (return light) proceeding from the PO 26 toward the MO 22.

In the optical isolator 80, a first polarizer 83, a Faraday rotator 84, and a second polarizer 88 are disposed in the stated order from the MO 22. The Faraday rotator 84 includes a Faraday material 85 and a magnet 86. In FIG. 3, a rightward arrow illustrated in the Faraday rotator 84 represents the direction of a magnetic field of the magnet 86. A double-headed arrow illustrated in each dashed-line circle in the drawing represents the direction of the polarization plane, in other words, polarization direction of a pulse laser beam when viewed in the direction in which the pulse laser beam proceeds.

As illustrated in the upper part of FIG. 3, a pulse laser beam linearly polarized in the horizontal direction is output from the MO 22. The polarization direction of the pulse laser beam output from the MO 22 is rotated by 45° in the anticlockwise direction through a ½ wave plate 81. The first polarizer 83 is disposed such that the transmission axis thereof is parallel to the polarization direction of the pulse laser beam output from the ½ wave plate 81, and accordingly, the pulse laser beam output from the ½ wave plate 81 transmits through the first polarizer 83.

The polarization direction of the pulse laser beam having transmitted through the first polarizer 83 is rotated by 45° in the clockwise direction through the Faraday rotator 84 to which the magnetic field is applied. Accordingly, the pulse laser beam output from the Faraday rotator 84 is horizontally polarized light. The second polarizer 88 is disposed such that the transmission axis thereof is parallel to the polarization direction of the pulse laser beam output from the Faraday rotator 84, and accordingly, the pulse laser beam output from the Faraday rotator 84 transmits through the second polarizer 88 and is then incident on the PO 26.

The ½ wave plate 81 adjusts the polarization direction of the pulse laser beam from the MO 22 so that the polarization direction of the pulse laser beam output from the MO 22 and the polarization direction of the pulse laser beam incident on the PO 26 are the same. Accordingly, any other module that depends on the polarization direction does not need to be changed.

As illustrated in the lower part of FIG. 3, return light from the PO 26 transmits through the second polarizer 88 in the same polarization direction as that of incident light on the PO 26, and the polarization direction thereof is rotated by 45° in the clockwise direction through the Faraday rotator 84 to which the magnetic field is applied. The polarization direction of the return light having passed through the Faraday rotator 84 is orthogonal to the transmission axis of the first polarizer 83, and accordingly, the return light is reflected by the first polarizer 83 and not incident on the MO 22.

A calcium fluoride ($CaF_2$) crystal is used as the Faraday material 85 of the Faraday rotator 84 in a case of suppressing return light of light having a short wavelength, such as an excimer laser having a wavelength of approximately 193 nm.

When a laser beam of high power such as 10 W or higher is incident on the $CaF_2$ crystal, influence of thermal birefringence becomes considerable and polarization purity degrades. With the degradation of polarization purity, the ratio of return light reflected by the first polarizer 83 decreases and the isolation ratio of the optical isolator 80 degrades.

4. Embodiment 1

4.1 Configuration

Figure 4:
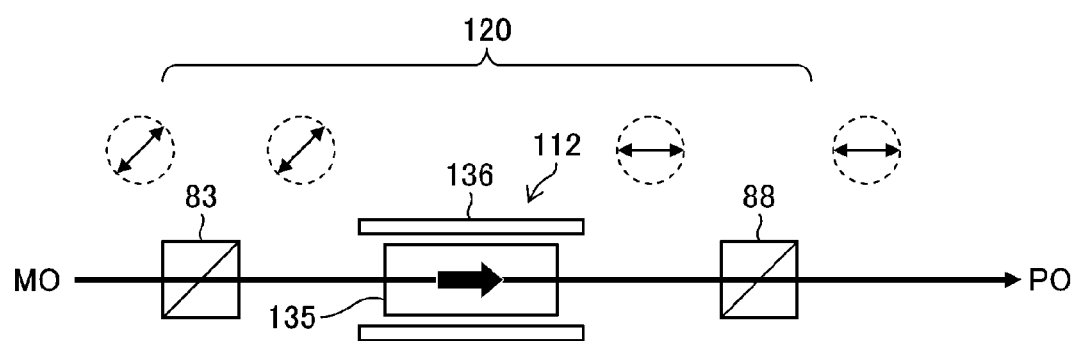
FIG. 4 schematically illustrates the configuration of an optical isolator according to Embodiment 1.

FIG. 4 schematically illustrates the configuration of an optical isolator 120 according to Embodiment 1. Description will be made on the difference of the configuration illustrated in FIG. 4 from the configuration illustrated in FIG. 3. The optical isolator 120 includes, in place of the Faraday rotator 84 in FIG. 3, a Faraday rotator 112 including a Faraday material 135. The Faraday material 135 is a $CaF_2$ crystal, and in Embodiment 1, the Faraday rotator 112 is disposed such that degradation of polarization purity of a laser beam upon transmission through the Faraday material 135 reduces, which is a difference from the configuration illustrated in FIG. 3.

Figure 5:
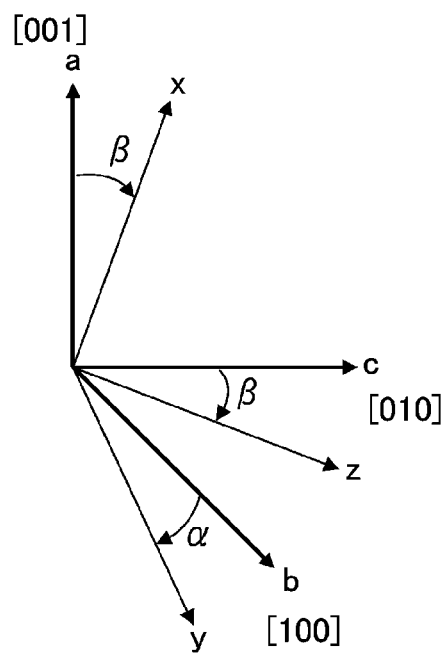
FIG. 5 is an explanatory diagram of definition of x, y, and z axes obtained by rotating crystallographic axes and rotation angles α and β.

Specifically, the Faraday rotator 112 is disposed such that the crystallographic axes of the Faraday material 135 and the propagation direction of incident light have the following relation. When the Faraday material 135 is a $CaF_2$ crystal, as illustrated in FIG. 5, a, b, and c axes are defined to be the [001], [100], and [010] crystallographic axes, respectively, and x, y, and z axes are defined to be respective axes obtained by rotating the three axes of the a, b, and c axes about the c axis by $\alpha$ and by $\beta$ about the b axis rotated by $\alpha$. The rotation angles $\alpha$ and $\beta$ will be described later.

Figure 6:
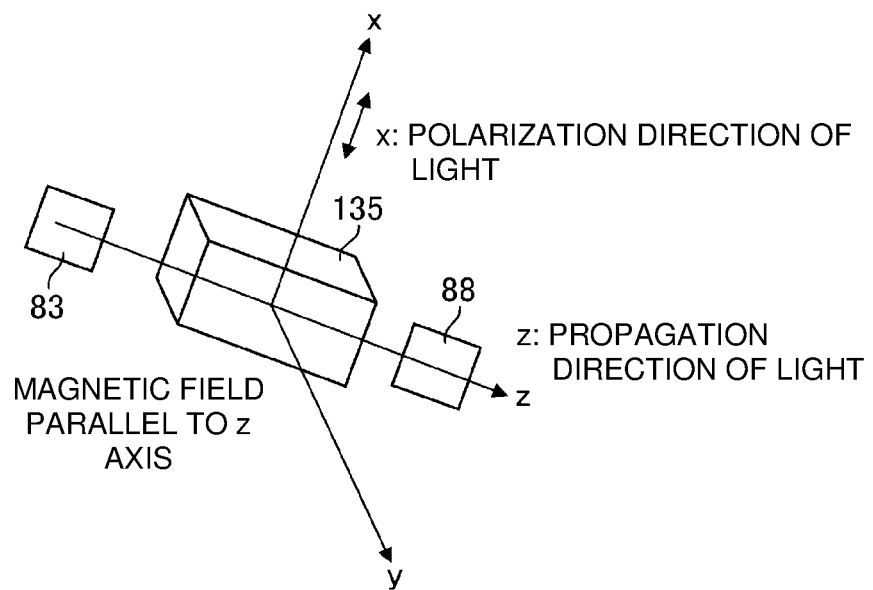
FIG. 6 is a perspective view illustrating an exemplary preferable disposition condition of a Faraday material.

As illustrated in FIG. 6, the Faraday material 135 is disposed such that the z axis of the Faraday material 135 is parallel to the propagation direction of a laser beam and the polarization direction of the laser beam is parallel to the x axis substantially at the center of the medium length of the Faraday material 135. The other configuration may be the same as in FIG. 3.

Figure 7:
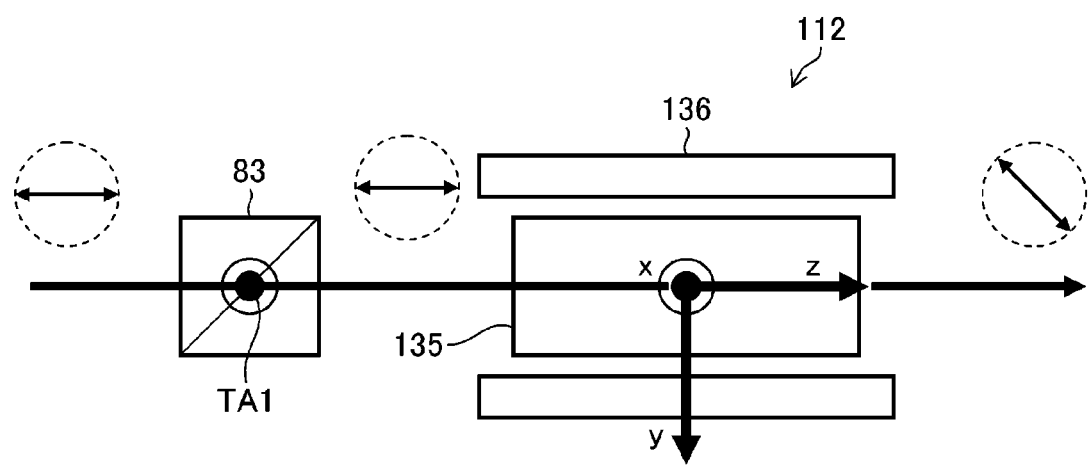
FIG. 7 is a schematic diagram illustrating the relation among the transmission axis of a first polarizer and the crystallographic axes of the Faraday material.
Figure 8:
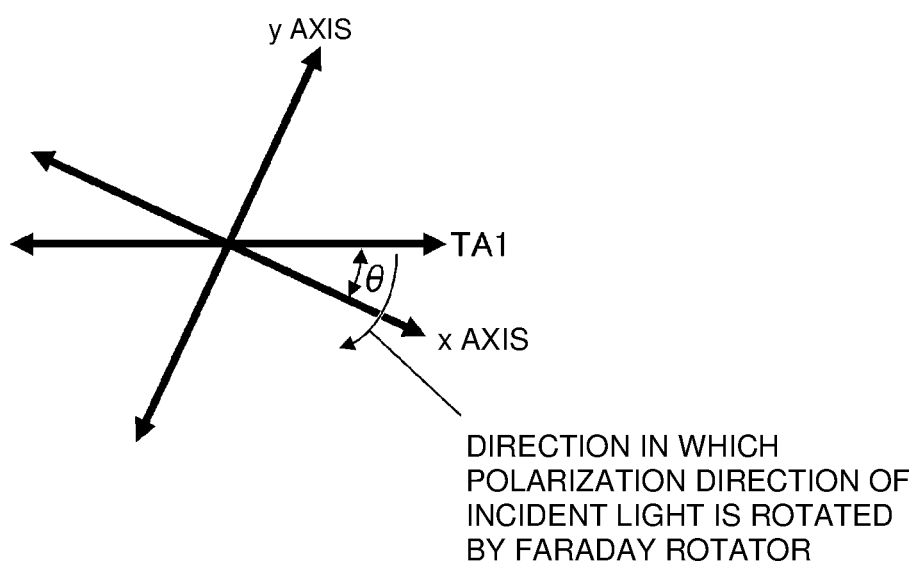
FIG. 8 illustrates the relation among the transmission axis of the first polarizer and x and y axes of the Faraday material when viewed in a direction in which incident light propagates in FIG. 7.

4.2 Relation Between Transmission Axis of First Polarizer and Crystallographic Axes of Faraday Material FIG. 7 is a side view schematically illustrating the relation between a transmission axis TA1 of the first polarizer 83 and the x and y axes of the Faraday material 135. FIG. 8 illustrates the relation between the transmission axis TA1 of the first polarizer 83 and the x and y axes of the Faraday material 135 when viewed in the direction (z axis) in which incident light propagates. The polarization direction of light incident on the Faraday rotator 112 through the first polarizer 83 is parallel to the x axis. The direction in which the polarization direction of the incident light is rotated by the Faraday rotator 112 is the clockwise direction in FIG. 8. A preferable range of an angle difference θ between the transmission axis TA1 of the first polarizer 83 and the polarization direction of the incident light is 0° to 45° inclusive in the direction in which the polarization direction of the incident light is rotated by the Faraday rotator 112.

4.3 Rotation Angles α and β

Figure 9:
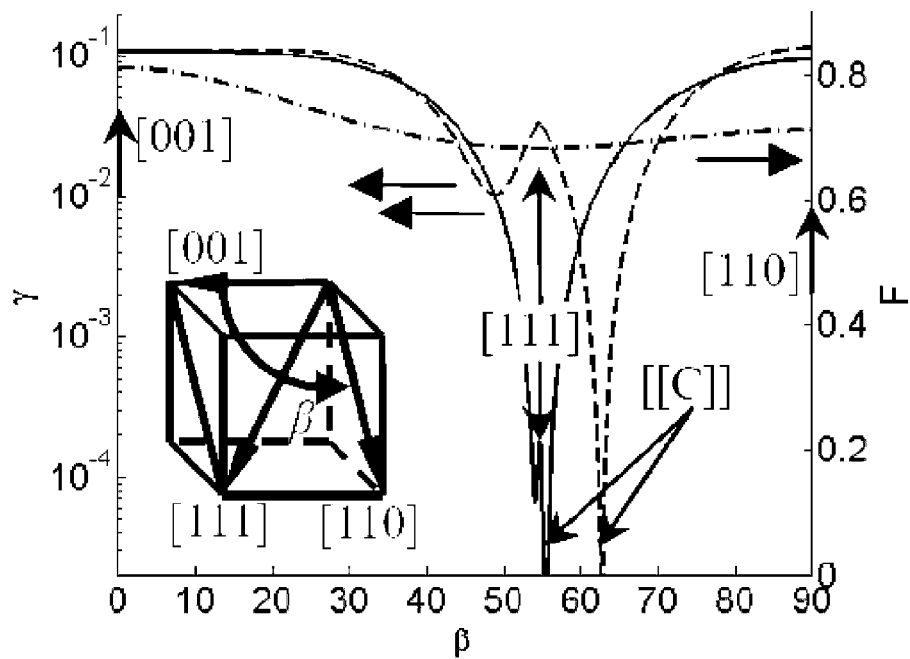
FIG. 9 is a graph copied from Non-Patent Document 1, illustrating the relation between a depolarization degree γ and the rotation angle β, the depolarization degree γ being the ratio of a polarization component of transmitting light relative to total incident power of light incident on a $CaF_2$ crystal, the polarization component being orthogonal to the polarization direction of the incident light.

FIG. 9 is a graph as a copy of FIG. 1 disclosed in Non-Patent Document 1. FIG. 9 illustrates dependency of a depolarization degree γ on the rotation angle β, the depolarization degree γ being the ratio of a polarization component of transmitting light relative to total incident power of light incident on a $CaF_2$ crystal, the polarization component being orthogonal to the polarization direction of incident light. The rotation angle α in FIG. 9 is 45°. According to a graph illustrated with a solid line in FIG. 9, when β is 50° to 60°, the polarization direction changes at a small rate and degradation of polarization purity is small.

Figures 10, 11:
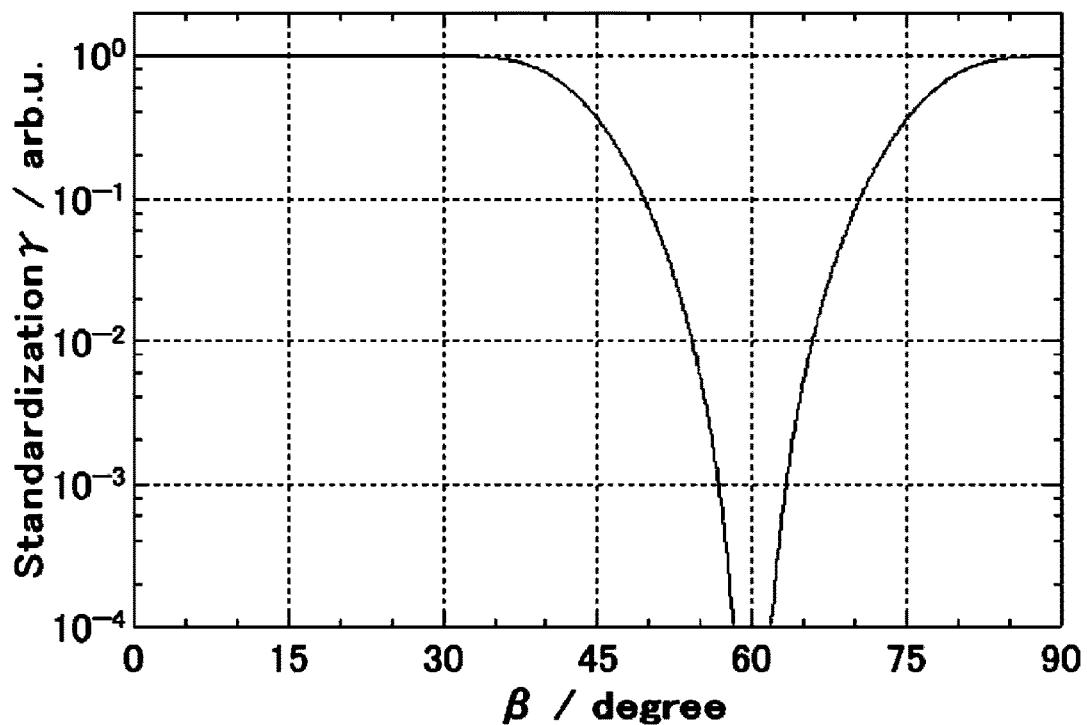
FIG. 10 is a graph estimating the relation between the depolarization degree γ and the rotation angle β when the wavelength of incident light is 193 nm.
FIG. 11 is a table listing preferable ranges of a magnetic field applied to a Faraday rotator and the thickness of the Faraday material.

The wavelength of the incident light is 1074 nm in the graph of FIG. 9. The relation between the value of γ and the rotation angle β when the wavelength of the incident light is 193 nm is estimated as illustrated in FIG. 10. In FIG. 10, the vertical axis is normalized by taking, as "1", the value of γ when β is 0°.

According to FIG. 10, the range of β is preferably 45° to 75°, more preferably 54° to 66°, and most preferably 58° to 62°. It is estimated from the graph illustrated in FIG. 10 that the rotation angle β is preferably 45° to 75° when α is 45°. An allowable range of α is 45°±5°. Notation of a numerical range such as "45° to 75°" means a range including the numerical values before and after "to", and for example, notation of "45° to 75°" means "45° to 75° inclusive". The rotation angle α is an example of a "first angle" in the present disclosure, and the rotation angle β is an example of a "second angle" in the present disclosure.

The wavelength of the incident light is 193 nm in the graph illustrated in FIG. 10. Although there is a slight difference from the graph illustrated in FIG. 10, substantially the same graph as illustrated in FIG. 10 can be obtained also when the wavelength of the incident light is another ultraviolet wavelength such as 248 nm. Thus, the above-described preferable ranges of the rotation angles α and β, which are understood from FIG. 10, are also applicable to incident light having another ultraviolet wavelength such as 248 nm.

4.4 Preferable Ranges of Magnetic Field and Thickness of Faraday Material

Preferable ranges of the magnetic field and the thickness of the Faraday material 135 when the Faraday material 135 is a $CaF_2$ crystal are illustrated in FIG. 11 for a case in which the wavelength of incident light is 193 nm and a case in which the wavelength of incident light is 248 nm. The oscillation wavelength of an ArF excimer laser includes a wavelength of 193 nm. The oscillation wavelength of a KrF excimer laser includes a wavelength of 248 nm.

The preferable ranges are selected based on easiness of achieving the magnetic field. The magnetic field in the most preferable range has a magnetic flux density when a neodymium magnet having strong magnetic force or the like is used. The thickness of the Faraday material 135 is calculated to be a thickness with which the polarization plane is rotated by 45° due to the Faraday effect based on a selected material, the magnetic flux density of the magnetic field, and the Verdet constant.

When the Faraday material 135 is a $CaF_2$ crystal and the wavelength of incident light is 193 nm, which is the oscillation wavelength of an ArF excimer laser, selectable ranges of the magnetic field applied to the Faraday rotator 112 and the thickness of the Faraday material 135 in the optical axis direction are 0.5 T to 3.0 T and 6 mm to 40 mm as illustrated in FIG. 11. The ranges are more preferably 0.75 T to 2.9 T and 10 mm to 30 mm, and most preferably 0.8 T to 1.5 T and 15 mm to 25 mm.

When the wavelength of incident light is 248 nm, which is the oscillation wavelength of a KrF excimer laser, selectable ranges of the magnetic field applied to the Faraday rotator 112 and the thickness of the Faraday material 135 in the optical axis direction are 0.5 T to 3.0 T and 13 mm to 83 mm. The ranges are more preferably 0.75 T to 2.9 T and 20 mm to 55 mm, and most preferably 0.8 T to 1.5 T and 30 mm to 50 mm.

The Faraday rotator 112 is produced based on determined parameters such as the directions of the crystallographic axes and the thickness in the optical axis direction at a stage where a $CaF_2$ crystal to be incorporated in the Faraday rotator 112 is fabricated.

The Faraday material 135 may include a plurality of divided portions and the above-described thickness may be satisfied by the sum of the portions. The number of the divided portions may be, for example, two, three, or four.

4.5 Allowable Angle Difference Between Transmission Axis of Polarizer and Polarization Direction of Laser Beam The transmission axis of each of the first polarizer 83 and the second polarizer 88 and the polarization direction of a pulse laser beam incident on the polarizer are most preferably parallel to each other but do not necessarily need to be precisely parallel, and an angle difference therebetween is allowed as long as an intended function can be achieved in practical use.

Figure 12:
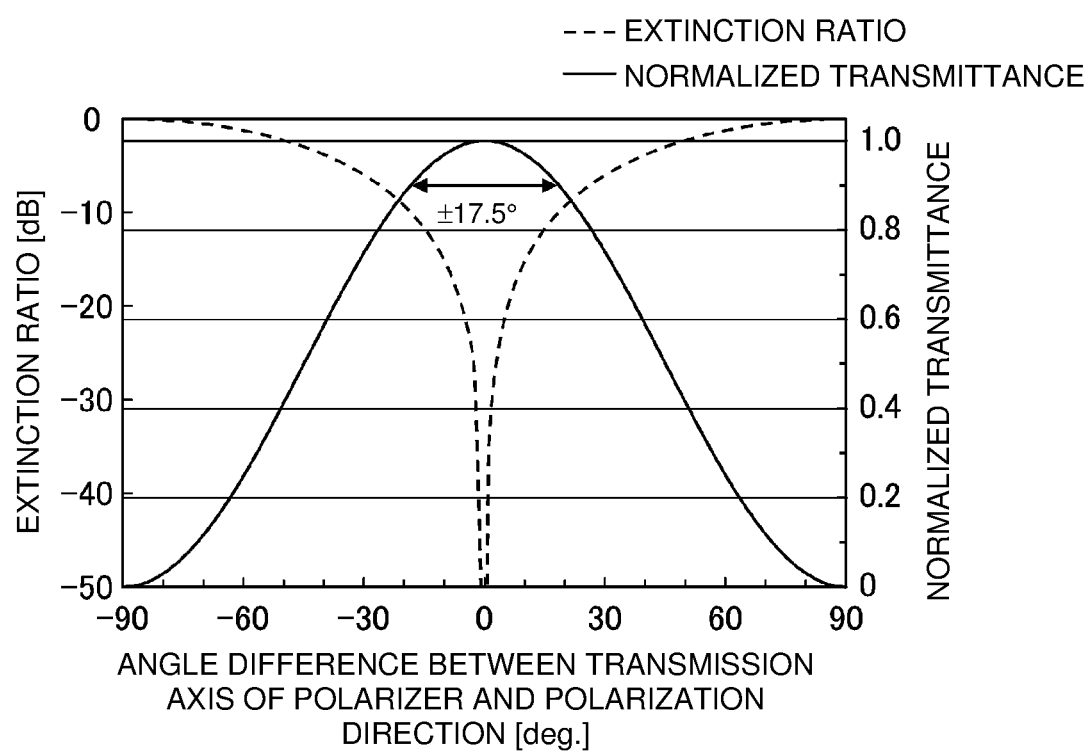
FIG. 12 is a graph illustrating the relation between the angle difference between the transmission axis of a polarizer and the polarization direction of a pulse laser beam and an extinction ratio and is a graph illustrating a normalized transmittance converted from the extinction ratio.

FIG. 12 is a graph illustrating the relation between the angle difference between the transmission axis of a polarizer and the polarization direction of a pulse laser beam and an extinction ratio (dB) and is a graph illustrating a normalized transmittance converted from the extinction ratio. The vertical axis on the left side in FIG. 12 represents the extinction ratio, and the vertical axis on the right side represents the normalized transmittance. The normalized transmittance is obtained by normalizing, to 1.0, the transmittance when the angle difference is 0°.

The first polarizer 83 and the second polarizer 88 can sufficiently effectively function in practical use when the normalized transmittance for an incident pulse laser beam is equal to or larger than 0.9 for each of the first polarizer 83 through which a pulse laser beam output from the MO 22 transmits and the second polarizer 88 through which a pulse laser beam output from the Faraday rotator 112 transmits. Thus, according to FIG. 12, the angle difference between the transmission axis of the first polarizer 83 or the second polarizer 88 and the polarization direction of a pulse laser beam has a preferable allowable range of ±17.5° with which the normalized transmittance is equal to or larger than 0.9.

4.6 Operation

Upon transmission through the Faraday rotator 112, the polarization direction of a linearly polarized pulse laser beam output from the MO 22 and having transmitted through the first polarizer 83 is rotated by 45° in the clockwise direction by the Faraday rotator 112 to which the magnetic field is applied. The second polarizer 88 is disposed such that the transmission axis thereof is parallel to the polarization direction of the pulse laser beam output from the Faraday rotator 112. Accordingly, the pulse laser beam output from the Faraday rotator 112 transmits through the second polarizer 88 and is then incident on the PO 26.

Return light from the PO 26 transmits through the second polarizer 88 and the polarization direction thereof is rotated by 45° in the clockwise direction by the Faraday rotator 112 to which the magnetic field is applied. The polarization direction of the return light having transmitted through the Faraday rotator 112 is orthogonal to the transmission axis of the first polarizer 83, and accordingly, the return light is reflected by the first polarizer 83. In this manner, the return light from the PO 26 is reflected by the first polarizer 83 after transmitting through the Faraday rotator 112, and thus is suppressed from being incident on the MO 22.

A condition that "the polarization direction of a laser beam is parallel to the x axis at the center of the Faraday material 135", which is described above with reference to FIG. 6, is one of preferable conditions. The Faraday rotator 112 does not necessarily need to be disposed such that the polarization direction is parallel to the x axis precisely at the central position of the medium length of the Faraday material 135. Since the polarization plane of light incident on the Faraday material 135 is rotated due to the Faraday effect, the effect of suppressing degradation of polarization purity is high as long as the polarization direction is parallel to the x axis halfway through the optical path of light proceeding inside the medium of the Faraday material 135 (somewhere in the medium of the Faraday material 135). It is particularly preferable to dispose the Faraday rotator 112 such that the polarization direction is parallel to the x axis near the center of the thickness of the Faraday material 135 because the effect of suppressing degradation of polarization purity is averaged.

4.7 Effect

With the optical isolator 120 according to Embodiment 1, degradation of polarization purity due to influence of thermal birefringence is suppressed and a high isolation ratio can be maintained even when a laser beam of high power is incident on the Faraday rotator 112.

When the Faraday rotator 112 is disposed such that the above-described condition is satisfied, deformation due to a photoelastic effect decreases and influence of thermal birefringence can be prevented for the same amount of heat input.

4.8 Crystallographic Axis Verification Method

Whether an optical isolator has a configuration that satisfies the condition described above in Embodiment 1 can be verified by, for example, a method as follows.

[Procedure 1] The crystallographic axes of the Faraday material 135 are specified by performing crystallographic orientation analysis of the Faraday material ($CaF_2$ crystal) 135 in the Faraday rotator 112 by the back-reflection Laue method or the transmission Laue method.

[Procedure 2] The transmission axis of the first polarizer 83 is specified from a mark stamped on the first polarizer 83. Alternatively, the direction of the transmission axis is measured by using a linearly polarized laser beam.

Through the above-described procedures 1 and 2, the relation among the crystallographic axes of the Faraday material 135 and the propagation direction of incident light is determined. In addition, the relation among the crystallographic axes of the Faraday material 135 and the transmission axis of the first polarizer 83 is determined.

4.9 Modification

In the example described in Embodiment 1, the polarization direction of outgoing light incident on the Faraday rotator 112 through the first polarizer 83 is maintained upon transmission through the Faraday rotator 112 and the polarization direction of return light incident on the Faraday rotator 112 through the second polarizer 88 is rotated by 90° upon transmission through the Faraday rotator 112, but the present invention is not limited to the example and the angle difference of the polarization direction upon transmission through the Faraday rotator 112 is allowed as long as an intended function can be achieved in practical use. According to FIG. 12, the polarization direction of outgoing light incident on the Faraday rotator 112 through the first polarizer 83 may be maintained to an angle difference of 17.5° or smaller upon transmission through the Faraday rotator 112, and the polarization direction of return light incident on the Faraday rotator 112 through the second polarizer 88 may be rotated by an angle of 90°±17.5° or smaller upon transmission through the Faraday rotator 112. With this configuration, the polarization direction of outgoing light incident on the first polarizer 83 and the polarization direction of return light returning from the PO 26 and incident on the first polarizer 83 through the Faraday rotator 112 intersect each other at an angle of 90°±17.5° or smaller, and accordingly, the return light is reflected by the first polarizer 83 and suppressed from being incident on the MO 22.

5. Embodiment 2

5.1 Configuration

Figure 13:
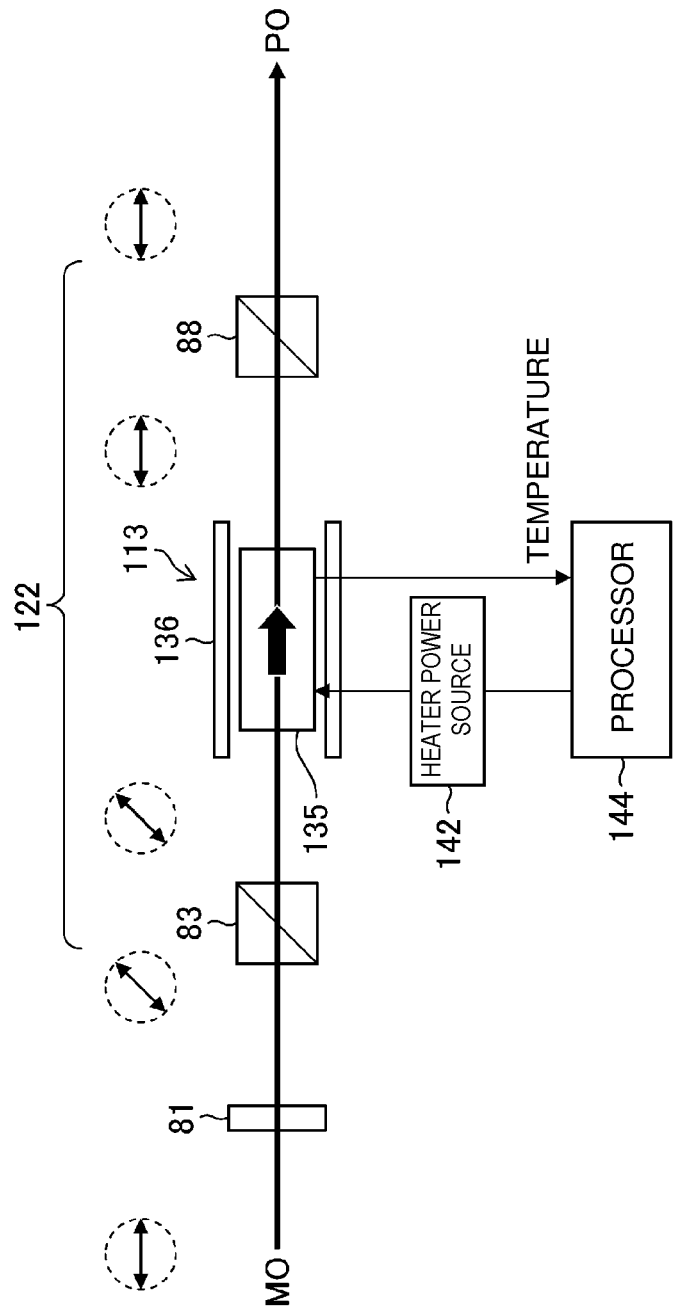
FIG. 13 schematically illustrates the configuration of an optical isolator according to Embodiment 2.

FIG. 13 schematically illustrates the configuration of an optical isolator 122 according to Embodiment 2. Description will be made on the difference of the configuration illustrated in FIG. 13 from the configurations illustrated in FIGS. 3 and 4. The optical isolator 122 according to Embodiment 2 includes a Faraday rotator 113 the temperature of which can be adjusted in place of the Faraday rotator 112 in Embodiment 1 and has a configuration for controlling the Faraday rotator 113 to a constant temperature, which is a difference from the configuration of Embodiment 1.

Figure 14:
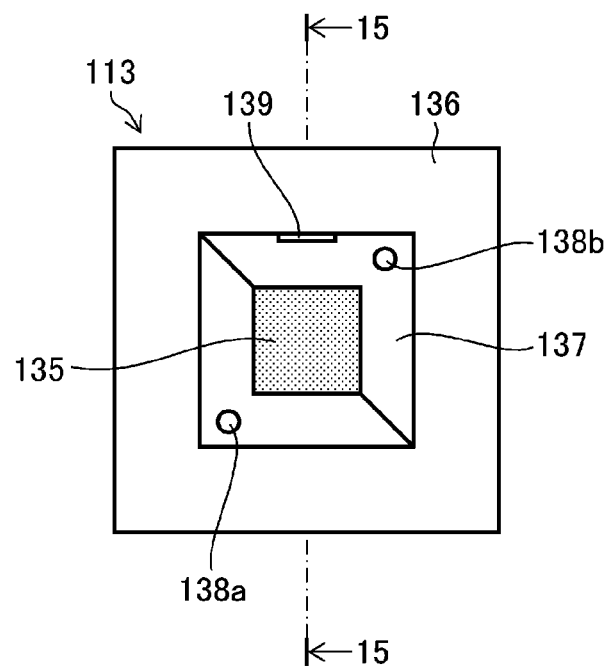
FIG. 14 is a front view of a Faraday rotator applied to Embodiment 2.
Figure 15:
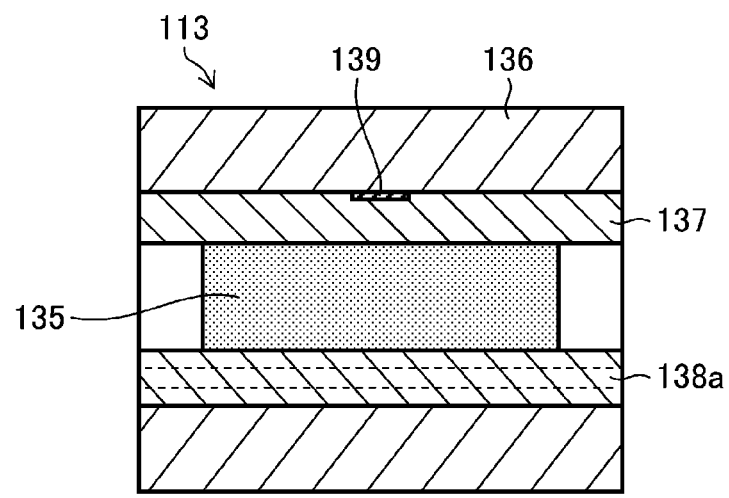
FIG. 15 is a cross-sectional view along line 15-15 in FIG. 14.

FIG. 14 is a front view schematically illustrating the configuration of the Faraday rotator 113, and FIG. 15 is a cross-sectional view along line 15-15 in FIG. 14. The Faraday material 135 is held by a holder 137 and disposed inside a magnet 136 having a hollow structure. The Faraday rotator 113 includes heaters 138a and 138b and a temperature sensor 139. The heaters 138a and 138b and the temperature sensor 139 are attached to the holder 137. The heaters 138a and 138b are preferably disposed at symmetric positions with the Faraday material 135 interposed therebetween and extend in parallel to the optical axis direction. The temperature sensor 139 detects the temperature of the Faraday rotator 113.

The optical isolator 122 includes a heater power source 142 and a processor 144 configured to control the temperature of the Faraday rotator 113 (refer to FIG. 13). The heater power source 142 supplies electric power to the heaters 138a and 138b.

The processor 144 controls the heater power source 142 to keep constant the temperature of the Faraday rotator 113 based on information obtained from the temperature sensor 139. The description of "keep constant" includes to keep in an allowed range. The processor 144 controls the heaters 138a and 138b through the heater power source 142 to suppress temperature change of the Faraday material 135. The processor 144 is a processing device including a storage device in which a control program is stored and a central processing unit (CPU) configured to execute the control program.

The other configuration may be the same as in Embodiment 1. The Faraday rotator 113 is disposed such that the conditions and the like described above with reference to FIGS. 5 to 11 are satisfied.

5.2 Operation

The processor 144 drives the heaters 138a and 138b through the heater power source 142, monitors temperature with the temperature sensor 139 of the Faraday rotator 113, and adjusts the temperature of the Faraday rotator 113 to keep the temperature at a predetermined temperature. The predetermined temperature is, for example, 100° C. or lower and preferably at room temperature. A preferable control range of temperature is ±1° C. The other operation is the same as in Embodiment 2.

5.3 Effect

The preferable angle β illustrated in FIG. 10 has temperature dependency, and thus, with the optical isolator 122 according to Embodiment 2, degradation of polarization purity due to change of the preferable angle β can be suppressed by controlling temperature constant and a high isolation ratio can be maintained.

Moreover, with the configuration of Embodiment 2, change of an optical path length due to temperature change can be suppressed by controlling temperature constant, and accordingly, the rotation angle of polarization can be kept constant and degradation of the isolation ratio can be suppressed.

6. Embodiment 3

6.1 Configuration

Figure 16:
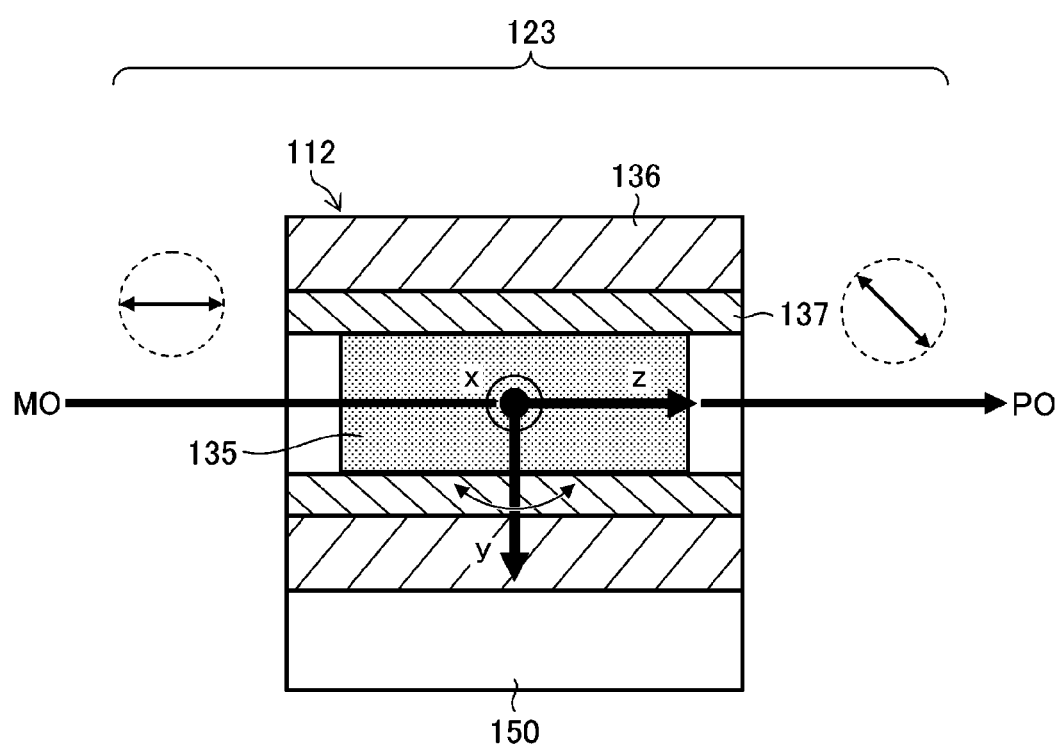
FIG. 16 schematically illustrates the configuration of an optical isolator according to Embodiment 3.

FIG. 16 schematically illustrates the configuration of part of the Faraday rotator 112 in an optical isolator 123 according to Embodiment 3. Similarly to the optical isolator 120 in FIG. 4, the optical isolator 123 includes the first polarizer 83 and the second polarizer 88, which are not illustrated in FIG. 16. Description will be made on the difference of the configuration illustrated in FIG. 16 from the configuration illustrated in FIG. 4.

The optical isolator 123 according to Embodiment 3 includes a rotation stage 150 configured to rotate the Faraday rotator 112 about the y axis. The other configuration may be the same as in FIG. 4.

6.2 Operation

As the rotation stage 150 is moved, the Faraday rotator 112 rotates about the y axis. Since the Faraday rotator 112 is rotated about the y axis with the b axis rotated by α about the c axis, the rotation angle β can be adjusted while the rotation angle α is maintained.

6.3 Effect

With the optical isolator 123 according to Embodiment 3, the rotation angle β can be adjusted to an angle with which degradation of polarization purity upon transmission through the Faraday rotator 112 is small. As a result, the isolation ratio can be increased.

7. Embodiment 4

7.1 Configuration

Figure 17:
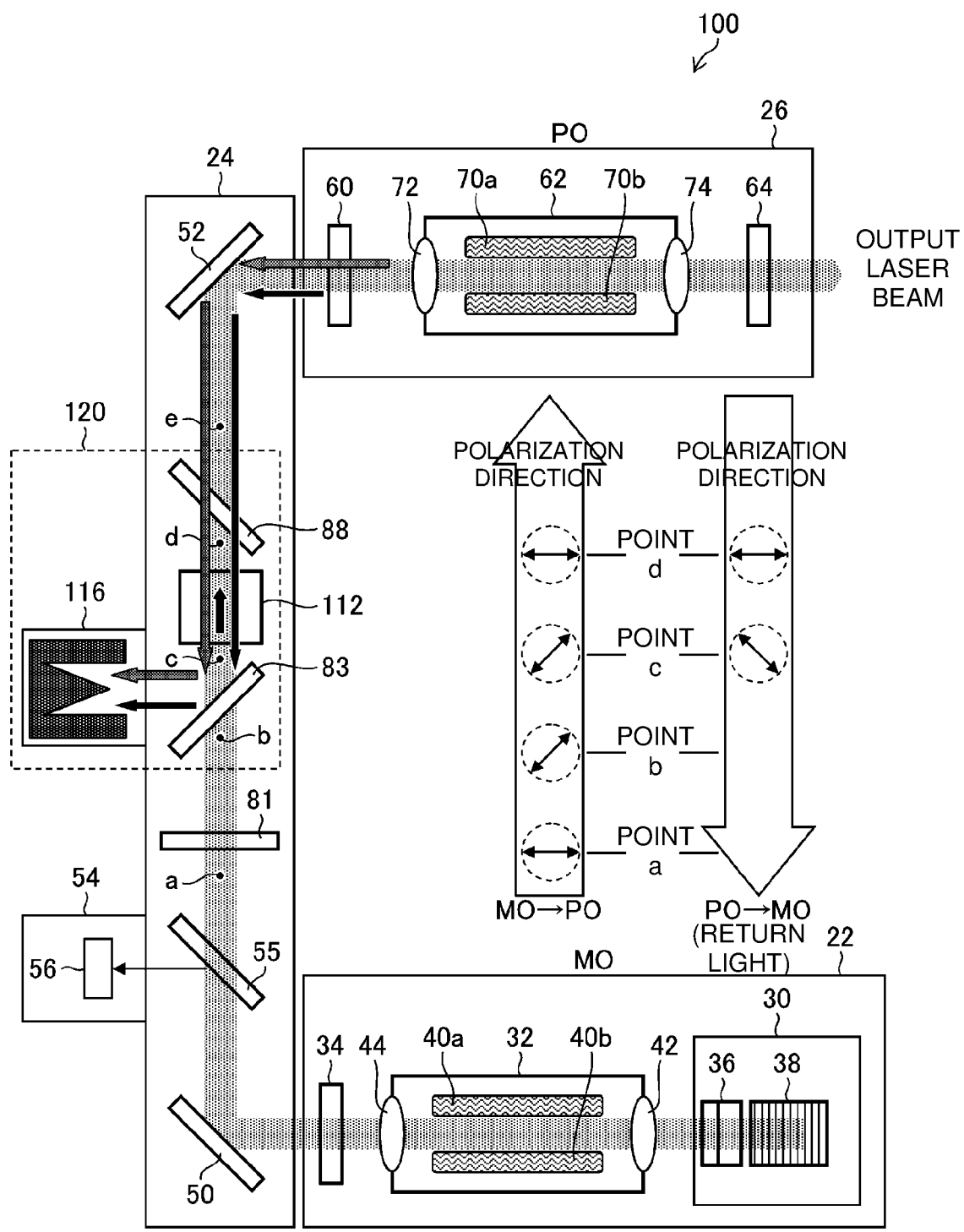
FIG. 17 schematically illustrates the configuration of an ultraviolet laser apparatus according to Embodiment 4.

FIG. 17 schematically illustrates an example of the configuration of an ultraviolet laser apparatus 100 according to Embodiment 4. Description will be made on the difference of the configuration illustrated in FIG. 17 from the configuration illustrated in FIG. 1. The configuration of the ultraviolet laser apparatus 100 is different from the configuration illustrated in FIG. 1 in that the ½ wave plate 81 and the optical isolator 120 are disposed on the optical path between the MO 22 and the PO 26. The optical isolator 120 has the same configuration as described above in Embodiment 1, in which the optical isolator 120 includes the first polarizer 83, the Faraday rotator 112, and the second polarizer 88, and the Faraday rotator 112 is disposed such that the crystallographic axes of a CaF$_2$ crystal satisfy particular conditions as described above in Embodiment 1.

The optical isolator 120 additionally includes a damper 116 for return light termination. The damper 116 is disposed such that return light reflected by the first polarizer 83 is incident on the damper 116. The other configuration may be the same as in FIGS. 1 and 4.

FIG. 17 also illustrates the polarization direction of a pulse laser beam at places illustrated with points a, b, c, and d on the optical path between the MO 22 and the PO 26. FIG. 17 illustrates the polarization direction of a pulse laser beam propagating in the direction from the MO 22 to the PO 26 at the places of the points a to d and the polarization direction of return light proceeding in the direction from the PO 26 to the MO 22 at the places of the points d and c.

7.2 Operation

Operation of the ½ wave plate 81 and the optical isolator 120 is the same as in FIG. 3 and Embodiment 1. The polarization direction of a pulse laser beam output from the MO 22 and polarized in a particular direction (at the point a) is rotated by 45° in the anticlockwise direction by the ½ wave plate 81 (at the point b).

Since the first polarizer 83 is disposed such that the transmission axis thereof is parallel to the polarization direction of the pulse laser beam output from the ½ wave plate 81, the pulse laser beam the polarization direction of which is rotated by the ½ wave plate 81 transmits through the first polarizer 83 (at the point c).

The pulse laser beam having transmitted through the first polarizer 83 is incident on the Faraday rotator 112 by which the polarization direction of the pulse laser beam is rotated by 45° in the clockwise direction (at the point d). Since the second polarizer 88 is disposed such that the transmission axis thereof is parallel to the polarization direction of the pulse laser beam rotated by the Faraday rotator 112, the pulse laser beam the polarization direction of which is rotated by the Faraday rotator 112 transmits through the second polarizer 88. The polarization direction of the pulse laser beam proceeding from the MO 22 to the PO 26 is the same at the points a and e.

At the point e in FIG. 17, the polarization direction of the pulse laser beam propagating in the direction from the MO 22 to the PO 26 and the polarization direction of the pulse laser beam (return light) returning in the direction from the PO 26 to the MO 22 are the same. Accordingly, the return light proceeding in the direction from the PO 26 to the MO 22 transmits through the second polarizer 88.

The polarization direction of the return light having transmitted through the second polarizer 88 is then rotated by 45° in the clockwise direction by the Faraday rotator 112 (at the point c). At the point c, the polarization direction of the pulse laser beam propagating in the direction from the MO 22 to the PO 26 is orthogonal to the polarization direction of the pulse laser beam returning in the direction from the PO 26 to the MO 22. Accordingly, the pulse laser beam returning in the direction from the PO 26 to the MO 22 is reflected by the first polarizer 83 and incident on the damper 116. The damper 116 absorbs and blocks light reflected by the first polarizer 83.

7.3 Effect

With the ultraviolet laser apparatus 100 according to Embodiment 4, degradation of polarization purity due to influence of thermal birefringence is suppressed and a high isolation ratio can be maintained even when a laser beam of high power is incident on the Faraday rotator 112.

Moreover, with the configuration of Embodiment 4, a pulse laser beam returning toward the MO 22 is reflected by the first polarizer 83 and suppressed from being incident on the MO 22, and accordingly, a thermal load on the MO 22 is reduced and energy stability, line width stability, and the like improve as compared to the configuration (FIG. 1) of the comparative example.

7.4 Modification

The MO pulse energy monitor 54 may be disposed on any of the upstream and downstream sides of the optical isolator 120 but is preferably disposed on the upstream side of the optical isolator 120 as in FIG. 17.

8. Embodiment 5

8.1 Configuration

Figure 18:
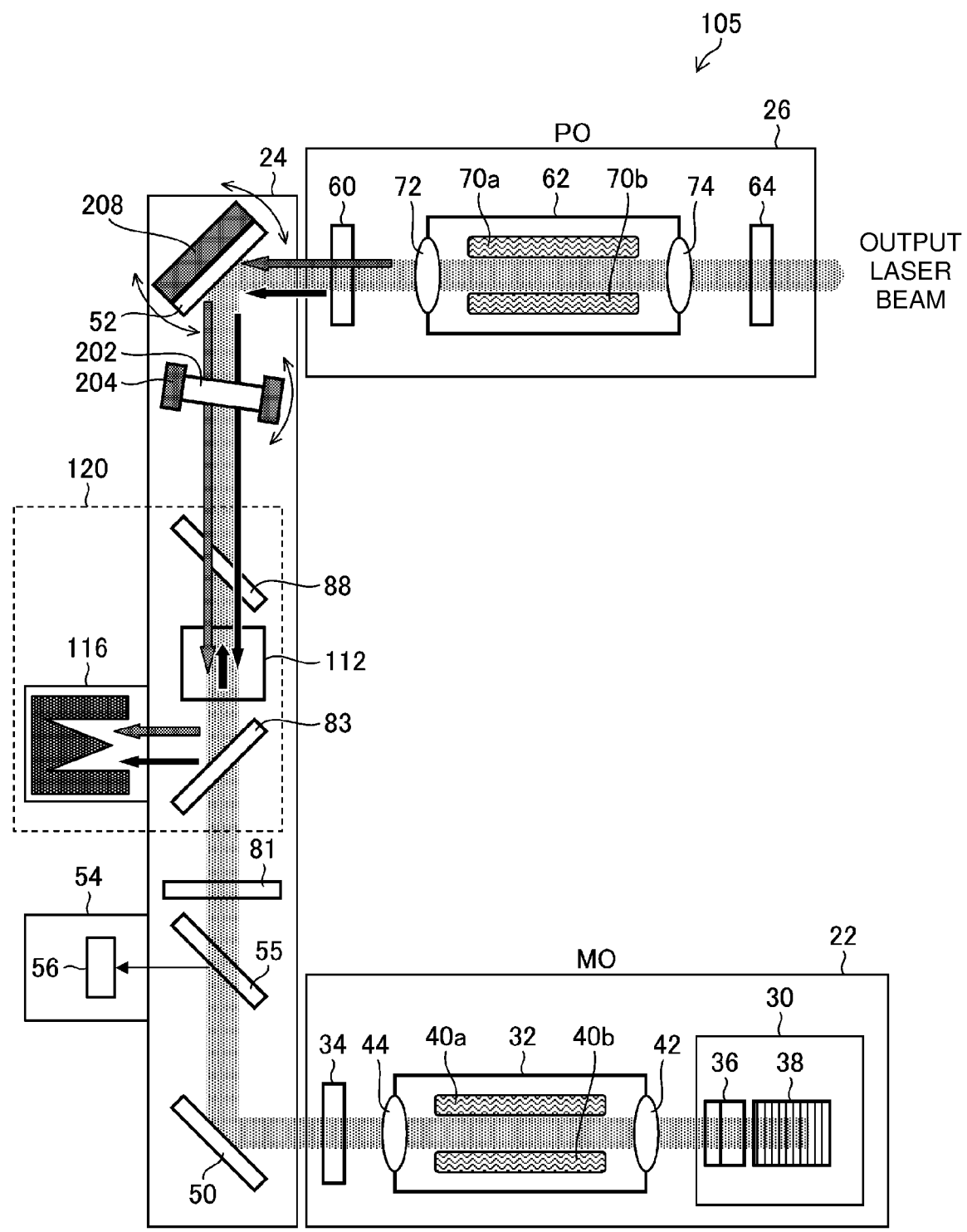
FIG. 18 schematically illustrates the configuration of an ultraviolet laser apparatus according to Embodiment 5.

FIG. 18 schematically illustrates the configuration of an ultraviolet laser apparatus 105 according to Embodiment 5. Description will be made on the difference of the configuration illustrated in FIG. 18 from the configuration illustrated in FIG. 17. The configuration of the ultraviolet laser apparatus 105 illustrated in FIG. 18 is different from the configuration illustrated in FIG. 17 in that a parallel plane substrate 202 that is adjustable about two axes and the high reflectance mirror 52 that is adjustable about two axes are disposed on the optical path between the second polarizer 88 and the PO 26. The parallel plane substrate 202 is held by a two-axis angle adjustment holder 204 that is adjustable with respect to an angle about a rotational axis that is each of two axes orthogonal to each other.

The parallel plane substrate 202 is disposed on the optical path between the second polarizer 88 and the high reflectance mirror 52. The parallel plane substrate 202 may be a calcium fluoride substrate. The two-axis angle adjustment holder 204 may be, for example, a holder that is adjustable with respect to an angle about a rotational axis that is each of an axis orthogonal to the sheet of FIG. 18 and an axis parallel to the substrate surface of the parallel plane substrate 202 and the sheet of FIG. 18.

The high reflectance mirror 52 is held by a two-axis angle adjustment holder 208 that is adjustable with respect to an angle about a rotational axis that is each of two axes orthogonal to each other. The two-axis angle adjustment holder 208 may be, for example, a holder that is adjustable with respect to an angle about a rotational axis that is each of an axis orthogonal to the sheet of FIG. 18 and an axis parallel to the reflection surface of the high reflectance mirror 52 and the sheet of FIG. 18.

8.2 Operation

Adjustment of the optical axis is performed by adjusting the two-axis-adjustable parallel plane substrate 202 and the two-axis-adjustable high reflectance mirror 52 so that a pulse laser beam from the MO 22 is most efficiently incident on the PO 26.

The two-axis-adjustable parallel plane substrate 202 is adjusted to shift the pulse laser beam from the MO 22 in parallel to the traveling direction thereof so that the pulse laser beam is most efficiently incident on the PO 26.

The two-axis-adjustable high reflectance mirror 52 is adjusted to change the incident angle of the pulse laser beam from the MO 22 on the PO 26 so that the pulse laser beam is most efficiently incident on the PO 26.

Each of the two-axis angle adjustment holder 204 and the two-axis angle adjustment holder 208 is an example of an "optical axis adjustment mechanism" in the present disclosure. The two-axis-adjustable parallel plane substrate 202 and the two-axis-adjustable high reflectance mirror 52 are both preferably included but only one of them may be included.

8.3 Effect

With the ultraviolet laser apparatus 105 according to Embodiment 5, the same effect as in Embodiment 4 is obtained. Moreover, with the configuration of Embodiment 5, the optical axis of injected light incident on the PO 26 can be more easily adjusted than with the configuration of Embodiment 4.

9. Embodiment 6

9.1 Configuration

Figure 19:
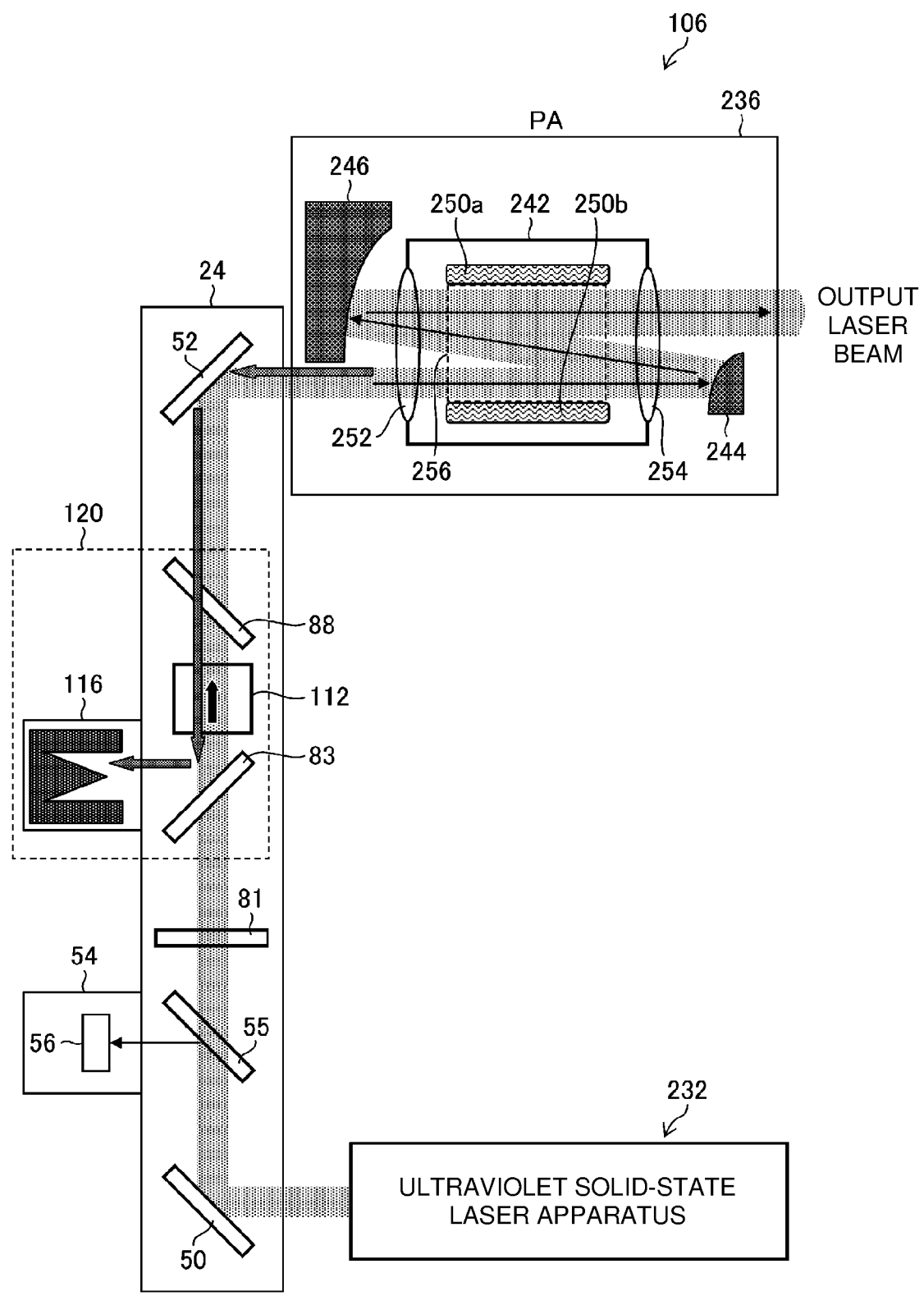
FIG. 19 schematically illustrates the configuration of an ultraviolet laser apparatus according to Embodiment 6.

FIG. 19 schematically illustrates the configuration of an ultraviolet laser apparatus 106 according to Embodiment 6. Description will be made on the difference of the configuration illustrated in FIG. 19 from the configuration illustrated in FIG. 17. The ultraviolet laser apparatus 106 illustrated in FIG. 19 includes an ultraviolet solid-state laser apparatus 232 as an oscillation-stage laser in place of the MO 22 in FIG. 17 and includes an excimer amplifier 236 in place of the PO 26. The other configuration may be the same as illustrated in FIG. 17.

The ultraviolet solid-state laser apparatus 232 outputs, for example, the fourth-order harmonic, fifth-order harmonic, or sixth-order harmonic (wavelength of 150 nm to 380 nm) of a solid-state laser with a basic wave in a near-infrared band (wavelength of 780 nm to 2500 nm). For example, the ultraviolet solid-state laser apparatus 232 outputs a seed beam having a wavelength of approximately 193 nm and is disposed such that the seed beam is incident on the excimer amplifier 236.

For example, the ultraviolet solid-state laser apparatus 232 may include a semiconductor laser system, a titanium sapphire amplifier, and a wavelength conversion system. The semiconductor laser system may include a distributed-feedback (DFB) semiconductor laser configured to output a CW laser beam having a wavelength of approximately 773.6 nm, and a semiconductor optical amplifier (SOA) configured to generate pulses of the CW laser beam. The wavelength conversion system includes a plurality of non-linear optical crystals, converts the wavelength of an incident pulse laser beam, and outputs a pulse laser beam of the fourth-order harmonic. The wavelength conversion system includes, for example, an LBO crystal and a KBBF crystal. The LBO crystal is a non-linear optical crystal expressed by a chemical formula $LiB_3O_5$. The KBBF crystal is a non-linear optical crystal expressed by a chemical formula $KBe_2BO_3F_2$.

The excimer amplifier 236 includes a chamber 242, a convex cylindrical mirror 244, and a concave cylindrical mirror 246.

The chamber 242 includes a pair of discharge electrodes 250a and 250b and two windows 252 and 254 through which a laser beam transmits. The discharge electrodes 250a and 250b are disposed oppositely to each other with a discharge space 256 interposed therebetween. The discharge space 256 is a space between the discharge electrodes 250a and 250b. The direction in which the discharge electrodes 250a and 250b are opposite to each other with the discharge space 256 interposed therebetween is a discharge direction. The chamber 242 is filled with the same laser gas as described above with reference to FIG. 1.

A convex curved surface of the convex cylindrical mirror 244 and a concave curved surface of the concave cylindrical mirror 246 are each coated with a high reflection film for a wavelength of approximately 193 nm.

The convex cylindrical mirror 244 and the concave cylindrical mirror 246 are disposed such that the seed beam from the ultraviolet solid-state laser apparatus 232 is subjected to beam expansion in the discharge direction and is amplified while passing through the discharge space 256 of the excimer amplifier 236 three times.

9.2 Operation

The seed beam output from the ultraviolet solid-state laser apparatus 232 transmits through the optical isolator 120 and is incident on the excimer amplifier 236. The seed beam incident on the excimer amplifier 236, which has a wavelength of approximately 193 nm, is reflected by the convex cylindrical mirror 244 and the concave cylindrical mirror 246 and passes through the discharge space 256 between the discharge electrodes 250a and 250b three times. Accordingly, the seed beam is expanded and amplified. The excimer amplifier 236 is an example of a "multipass amplifier" in the present disclosure. The present invention is not limited to the three-pass excimer amplifier 236 but may employ various multipass amplifiers.

Operation of the optical isolator 120 is the same as in Embodiment 1. The optical isolator 120 suppresses amplified spontaneous emission (ASE) or the like generated in the excimer amplifier 236 from being incident on the ultraviolet solid-state laser apparatus 232.

9.3 Effect

With the ultraviolet laser apparatus 106 according to Embodiment 6, light returning from the excimer amplifier 236 toward the ultraviolet solid-state laser apparatus 232 is not incident on the ultraviolet solid-state laser apparatus 232, and accordingly, a thermal load on the ultraviolet solid-state laser apparatus 232 is reduced and energy stability, line width stability, and the like improve as compared to the configuration of the comparative example.

10. Embodiment 7

10.1 Configuration

Figure 20:
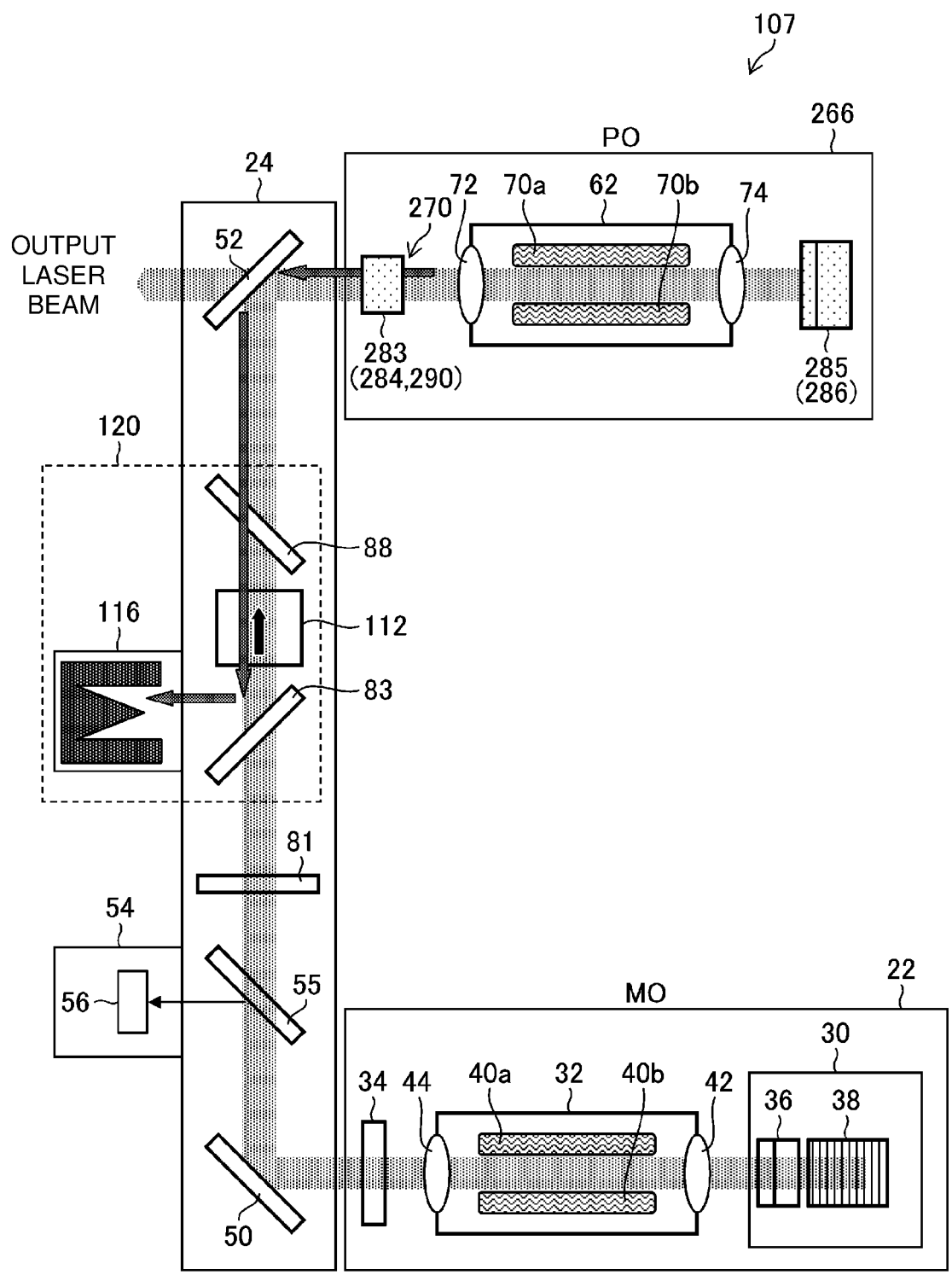
FIG. 20 schematically illustrates the configuration of an ultraviolet laser apparatus according to Embodiment 7.

FIG. 20 schematically illustrates the configuration of an ultraviolet laser apparatus 107 according to Embodiment 7. Description will be made on the difference of the configuration illustrated in FIG. 20 from the configuration illustrated in FIG. 17. The configuration of the ultraviolet laser apparatus 107 according to Embodiment 7 is different from the configuration of Embodiment 4 in the configuration of an amplification-stage laser and the configuration of a high reflectance mirror that introduces a laser beam from the MO 22 to the amplification-stage laser.

The amplification-stage laser of Embodiment 4 illustrated in FIG. 17 is the PO 26 including the Fabry-Perot optical resonator constituted by the rear mirror 60 and the output coupling mirror 64, but the amplification-stage laser of Embodiment 7 illustrated in FIG. 20 is a PO 266 including a ring resonator 270, which is a difference.

Figure 21:
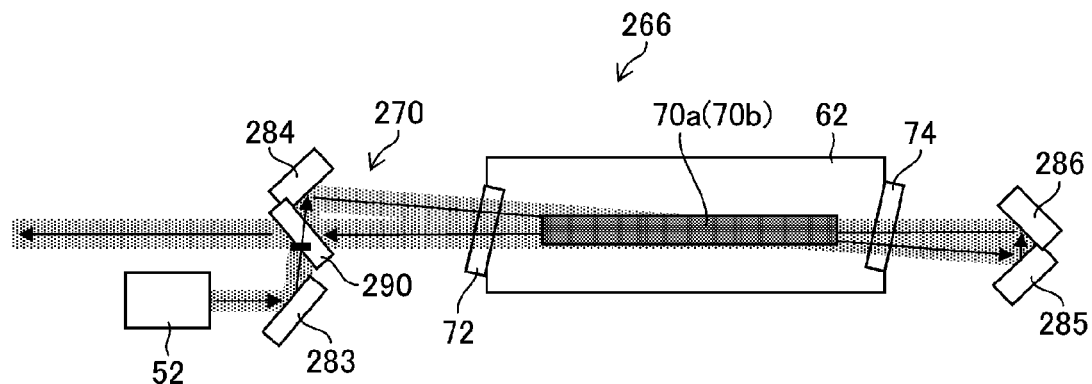
FIG. 21 is a top view schematically illustrating the configuration of an amplification-stage laser applied to Embodiment 7.

FIG. 21 is a top view schematically illustrating the configuration of the PO 266 applied to Embodiment 7. The ring resonator 270 includes a high reflectance mirror 284, a high reflectance mirror 285, a high reflectance mirror 286, and a partially reflective mirror 290.

In the ultraviolet laser apparatus 107, a high reflectance mirror 283 is disposed to introduce, to the ring resonator 270, a laser beam output from the MO 22 and reflected by the high reflectance mirrors 50 and 52. The high reflectance mirror 283 is disposed on the optical path between the high reflectance mirror 52 and the partially reflective mirror 290 such that the laser beam reflected by the high reflectance mirror 52 is incident on the partially reflective mirror 290.

10.2 Operation

A laser beam output from the MO 22 is sequentially reflected by the high reflectance mirror 50, the high reflectance mirror 52, and the high reflectance mirror 283 and is then incident on the ring resonator 270 from the partially reflective mirror 290.

The laser beam having transmitted through the partially reflective mirror 290 is reflected by the high reflectance mirror 284 and is then incident on the chamber 62 to be amplified, and thereafter, the laser beam is reflected by the high reflectance mirrors 285 and 286 and is incident on the chamber 62 to be amplified again. Then, the laser beam output from the chamber 62 partially transmits through the partially reflective mirror 290, and the other part is reflected and amplified at the ring resonator 270 again.

The amplified pulse laser beam having transmitted through the partially reflective mirror 290 is output from the ultraviolet laser apparatus 107.

The optical isolator 120 suppresses return light from the PO 266 from being incident on the MO 22. Operation of the ½ wave plate 81 and the optical isolator 120 is the same as in Embodiment 4 described above with reference to FIGS. 3 and 17.

10.3 Effect

With the ultraviolet laser apparatus 107 according to Embodiment 7, the same effect as in Embodiment 4 is obtained.

11. Electronic Device Manufacturing Method

Figure 22:
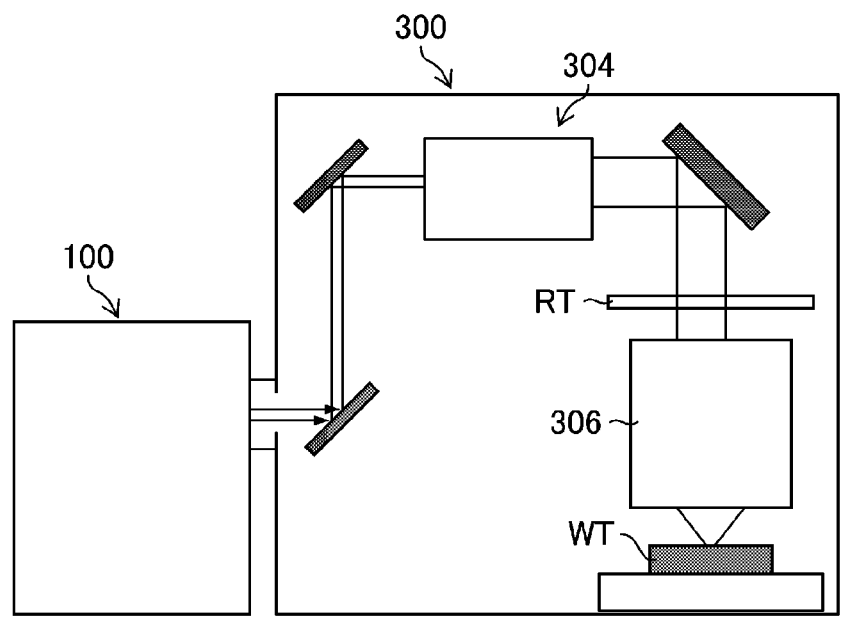
FIG. 22 schematically illustrates an example of the configuration of an exposure apparatus.

FIG. 22 schematically illustrates an example of the configuration of an exposure apparatus 300. The exposure apparatus 300 includes an illumination optical system 304 and a projection optical system 306. The illumination optical system 304 illuminates a reticle pattern of a non-illustrated reticle disposed on a reticle stage RT with a laser beam incident from the ultraviolet laser apparatus 100. The laser beam having transmitted through the reticle is imaged on a non-illustrated workpiece disposed on a workpiece table WT by reduced projection through the projection optical system 306. The workpiece is a photosensitive substrate such as a semiconductor wafer on which a photoresist is applied.

The exposure apparatus 300 translates the reticle stage RT and the workpiece table WT in synchronization to expose the workpiece to the laser beam reflected by the reticle pattern. Through such an exposure process as described above, the reticle pattern is transferred to the semiconductor wafer, and then a semiconductor device can be manufactured through a plurality of processes. The semiconductor device is an example of an "electronic device" in the present disclosure. The laser beam may be generated by using any of the ultraviolet laser apparatus 105, 106, and 107 described above in Embodiments 5 to 7 in place of the ultraviolet laser apparatus 100.

12. Other Application Example of Optical Isolator

The optical isolators 120, 122, and 123 exemplarily described in Embodiments 1 to 7 are not limited to an ultraviolet laser apparatus but are also applicable to various usages. For example, incident light on the optical isolator 120 is not limited to a pulse laser beam but may be a CW laser beam or radiation light. For example, the optical isolator 120 may be disposed at an exit for radiation light in an accelerator.

Alternatively, the optical isolator 120 may be disposed to suppress stray light having a wavelength in an ultraviolet region in a spectrometer including a heavy hydrogen lamp. This is the same for the optical isolators 122 and 123.

13. Other

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of any thereof and any other than A, B, and C.

What is claimed is:

1. An optical isolator comprising:
   a first polarizer disposed to have a transmission axis with a normalized transmittance of 0.9 or higher for incident light, the incident light being linearly polarized light having an ultraviolet wavelength;
   a Faraday rotator containing a Faraday material that rotates a polarization direction of light having transmitted through the first polarizer by a magnetic field; and
   a second polarizer disposed to have a transmission axis with a normalized transmittance of 0.9 or higher for the incident light having transmitted through the Faraday rotator,
   the Faraday material being calcium fluoride crystal,
   when a, b, and c axes are defined to be [001], [100], and [010] crystallographic axes of the calcium fluoride crystal, respectively, and x, y, and z axes are defined to be respective axes obtained by rotating the three axes of the a, b, and c axes by a first angle about the c axis and by a second angle about the b axis rotated by the first angle,
      the first angle being 40° to 50° inclusive,
      the second angle being 45° to 75° inclusive,
      the z axis being parallel to a propagation direction of light incident on the calcium fluoride crystal from the first polarizer,
      the calcium fluoride crystal being disposed such that the transmission axis of the first polarizer and the x axis have an angle difference of 0° to 45° inclusive.

2. The optical isolator according to claim 1, wherein the second angle is 54° to 66° inclusive.

3. The optical isolator according to claim 1, wherein the second angle is 58° to 62° inclusive.

4. The optical isolator according to claim 1, wherein the calcium fluoride crystal is disposed such that a polarization direction of light incident on the Faraday material from the first polarizer and propagating through a medium of the Faraday material becomes parallel to the x axis in the medium of the Faraday material due to Faraday effect.

5. The optical isolator according to claim 1, wherein
   a polarization direction of the incident light and the transmission axis of the first polarizer have an angle difference of 17.5° or smaller, and
   the polarization direction of the incident light having transmitted through the Faraday rotator and the transmission axis of the second polarizer have an angle difference of 17.5° or smaller.

6. The optical isolator according to claim 1, wherein
   a polarization direction of return light incident on the first polarizer from the second polarizer through the Faraday rotator intersects the transmission axis of the first polarizer at an angle of 90°±17.5° or smaller and the return light is reflected by the first polarizer.

7. The optical isolator according to claim 1, wherein
   a wavelength of the incident light is an oscillation wavelength of an ArF excimer laser or an oscillation wavelength of a KrF excimer laser.

8. The optical isolator according to claim 1, wherein
   a magnetic field applied to the Faraday rotator has a magnetic flux density of 0.5 T to 3.0 T inclusive.

9. The optical isolator according to claim 8, wherein
   the Faraday material has a thickness of 6 mm to 40 mm inclusive in an optical axis direction when a wavelength of the incident light is an oscillation wavelength of an ArF excimer laser.

10. The optical isolator according to claim 8, wherein
    the Faraday material has a thickness of 13 mm to 83 mm inclusive in an optical axis direction when a wavelength of the incident light is an oscillation wavelength of a KrF excimer laser.

11. The optical isolator according to claim 1, wherein
    the Faraday material includes a plurality of divided portions.

12. The optical isolator according to claim 1, wherein
    the Faraday rotator includes a heater and a temperature sensor so that a temperature of the Faraday material is controlled and kept in an allowable temperature range.

13. The optical isolator according to claim 1, further comprising
    a rotation stage configured to rotate the Faraday rotator about the y axis.

14. An ultraviolet laser apparatus comprising:
    an oscillation-stage laser configured to output a pulse laser beam of linearly polarized light having an ultraviolet wavelength;
    an amplifier configured to amplify and output the pulse laser beam; and
    an optical isolator disposed on an optical path between the oscillation-stage laser and the amplifier,
    the optical isolator including
       a first polarizer disposed to have a transmission axis with a normalized transmittance of 0.9 or higher for incident light, the incident light being linearly polarized light having an ultraviolet wavelength;
       a Faraday rotator containing a Faraday material that rotates a polarization direction of light having transmitted through the first polarizer by a magnetic field; and a second polarizer disposed to have a transmission axis with a normalized transmittance of 0.9 or higher for the incident light having transmitted through the Faraday rotator, the Faraday material being calcium fluoride crystal, when a, b, and c axes are defined to be [001], [100], and [010] crystallographic axes of the calcium fluoride crystal, respectively, and x, y, and z axes are defined to be respective axes obtained by rotating the three axes of the a, b, and c axes by a first angle about the c axis and by a second angle about the b axis rotated by the first angle, the first angle being 40° to 50° inclusive, the second angle being 45° to 75° inclusive, the z axis being parallel to a propagation direction of light incident on the calcium fluoride crystal from the first polarizer, the calcium fluoride crystal being disposed such that the transmission axis of the first polarizer and the x axis have an angle difference of 0° to 45° inclusive.

15. The ultraviolet laser apparatus according to claim 14, further comprising:
a heater disposed at the Faraday rotator;
a temperature sensor configured to detect a temperature of the Faraday rotator; and
a processor configured to control the heater to suppress temperature change of the Faraday material based on information from the temperature sensor.

16. The ultraviolet laser apparatus according to claim 14, further comprising
a rotation stage configured to rotate the Faraday rotator about the y axis.

17. The ultraviolet laser apparatus according to claim 14, further comprising
an optical axis adjustment mechanism disposed between the second polarizer and the amplifier and including an adjustment mechanism having at least two axes.

18. The ultraviolet laser apparatus according to claim 14, wherein
the oscillation-stage laser and the amplifier each include a chamber configured to be filled with laser gas.

19. The ultraviolet laser apparatus according to claim 14, wherein
the oscillation-stage laser is an ultraviolet solid-state laser.

20. An electronic device manufacturing method comprising:
generating a laser beam amplified by an amplifier by using an ultraviolet laser apparatus, the ultraviolet laser apparatus including
an oscillation-stage laser configured to output a pulse laser beam of linearly polarized light having an ultraviolet wavelength,
the amplifier configured to amplify and output the pulse laser beam, and
an optical isolator disposed on an optical path between the oscillation-stage laser and the amplifier,
the optical isolator including
a first polarizer disposed to have a transmission axis with a normalized transmittance of 0.9 or higher for incident light, the incident light being linearly polarized light having an ultraviolet wavelength,
a Faraday rotator containing a Faraday material that rotates a polarization direction of light having transmitted through the first polarizer by a magnetic field, and
a second polarizer disposed to have a transmission axis with a normalized transmittance of 0.9 or higher for the incident light having transmitted through the Faraday rotator,
the Faraday material being calcium fluoride crystal,
when a, b, and c axes are defined to be [001], [100], and [010] crystallographic axes of the calcium fluoride crystal, respectively, and x, y, and z axes are defined to be respective axes obtained by rotating the three axes of the a, b, and c axes by a first angle about the c axis and by a second angle about the b axis rotated by the first angle,
the first angle being 40° to 50° inclusive,
the second angle being 45° to 75° inclusive,
the z axis being parallel to a propagation direction of light incident on the calcium fluoride crystal from the first polarizer,
the calcium fluoride crystal being disposed such that the transmission axis of the first polarizer and the x axis have an angle difference of 0° to 45° inclusive;
outputting the amplified laser beam to an exposure apparatus; and
exposing a photosensitive substrate to the laser beam in the exposure apparatus to manufacture an electronic device.

* * * * *